United States Patent
Herbsommer et al.

(10) Patent No.: US 9,614,584 B2
(45) Date of Patent: Apr. 4, 2017

(54) SIMULTANEOUS LAUNCHING OF MULTIPLE SIGNAL CHANNELS IN A DIELECTRIC WAVEGUIDE USING DIFFERENT ELECTROMAGNETIC MODES

(71) Applicant: Texas Instruments Incorporated, Dallas, TX (US)

(72) Inventors: Juan Alejandro Herbsommer, Allen, TX (US); Benjamin Stassen Cook, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/846,672

(22) Filed: Sep. 4, 2015

(65) Prior Publication Data

US 2016/0344448 A1    Nov. 24, 2016

Related U.S. Application Data

(60) Provisional application No. 62/164,239, filed on May 20, 2015.

(51) Int. Cl.
| | |
|---|---|
| *H04B 1/40* | (2015.01) |
| *H04B 3/52* | (2006.01) |
| *H01P 3/16* | (2006.01) |
| *H01P 5/08* | (2006.01) |

(52) U.S. Cl.
CPC ............. *H04B 3/52* (2013.01); *H01P 3/16* (2013.01); *H01P 5/087* (2013.01)

(58) Field of Classification Search
CPC .................................. H04B 3/52; H04B 1/40
USPC ....................................................... 375/257
See application file for complete search history.

(56) References Cited

U.S. PATENT DOCUMENTS

| | | | |
|---|---|---|---|
| 2010/0001917 A1* | 1/2010 | Manasson | H01Q 13/28 343/785 |
| 2014/0287701 A1 | 9/2014 | Herbsommer et al. | |
| 2016/0006118 A1* | 1/2016 | Maruyama | H01Q 13/02 343/702 |

OTHER PUBLICATIONS

Benjamin S. Cook, et al, "Metallic Waveguide with Dielectric Core", U.S. Appl. No. 14/498,837, filed Sep. 26, 2014, pp. 1-27.
Benjamin S. Cook and Atif Shaminm, "Inkjet Printing of Novel Wideband and High Gain Antennas on Low-Cost Paper Substrate", IEEE Transactions on Antennas and Propagation, vol. 60, No. 9, Sep. 2012, pp. 4148-4156.
Sophocles J Orfanidis, "Electromagnetic Waves and Antennas", Chapter 9, Waveguides, 1999, pp. 362-410.

* cited by examiner

*Primary Examiner* — Michael Neff
(74) *Attorney, Agent, or Firm* — John R. Pessetto; Charles A. Brill; Frank D. Cimino

(57) ABSTRACT

A device is configured for transmitting multiple channels of information through a dielectric waveguide (DWG). The device generates at least a first radio frequency signal (RF) and a second RF signal. The first RF signal is launched into the DWG using a launching structure formed within a multilayer substrate to excite a first transmission mode of the DWG. The second RF signal is launched into the DWG using a launching structure formed within the multilayer substrate to excite a second transmission mode of the DWG, in which the second transmission mode is orthogonal to the first transmission mode.

20 Claims, 19 Drawing Sheets

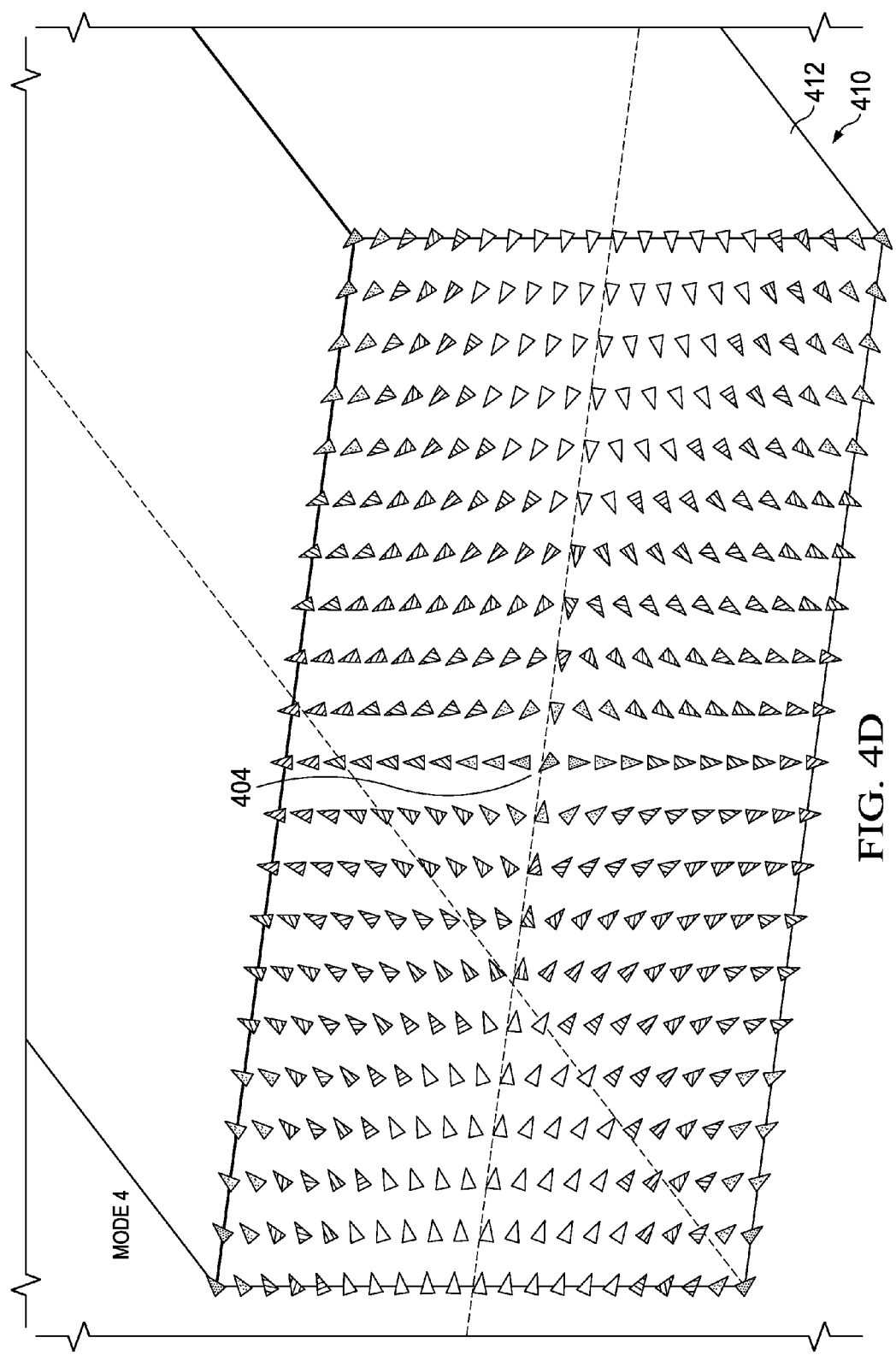

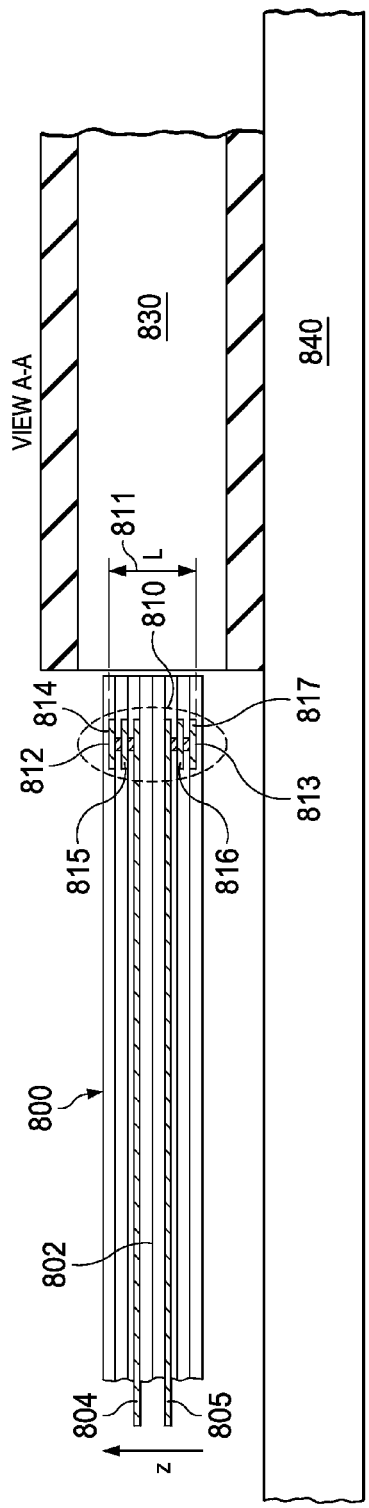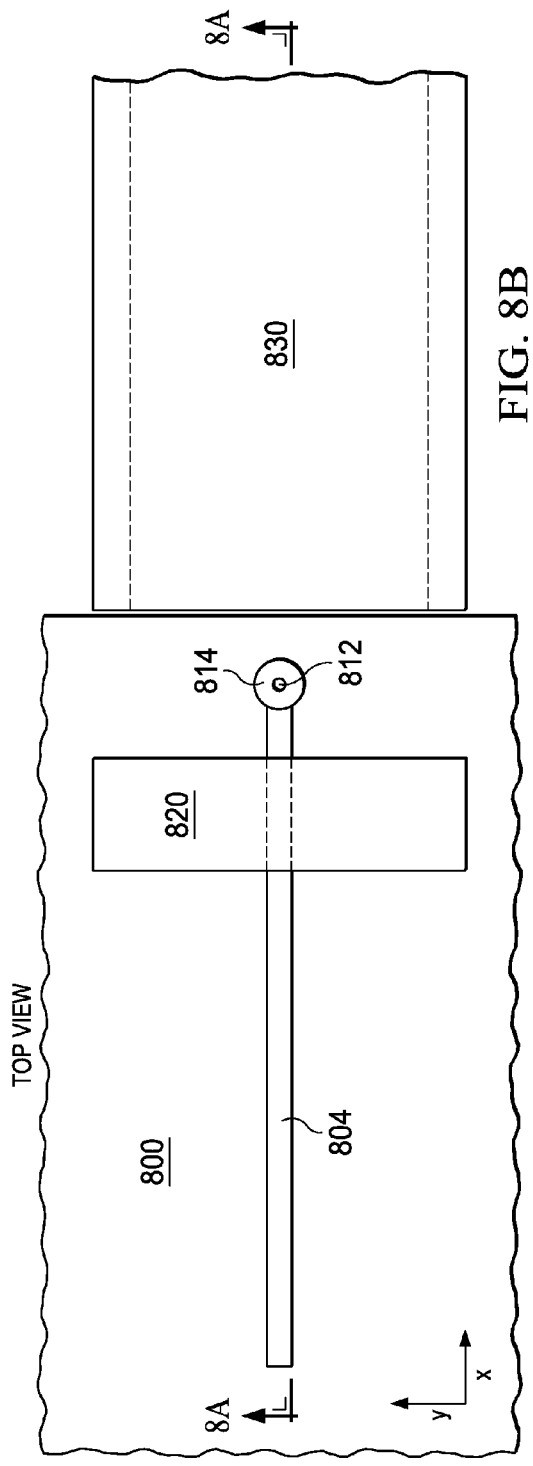
FIG. 8A
FIG. 8B

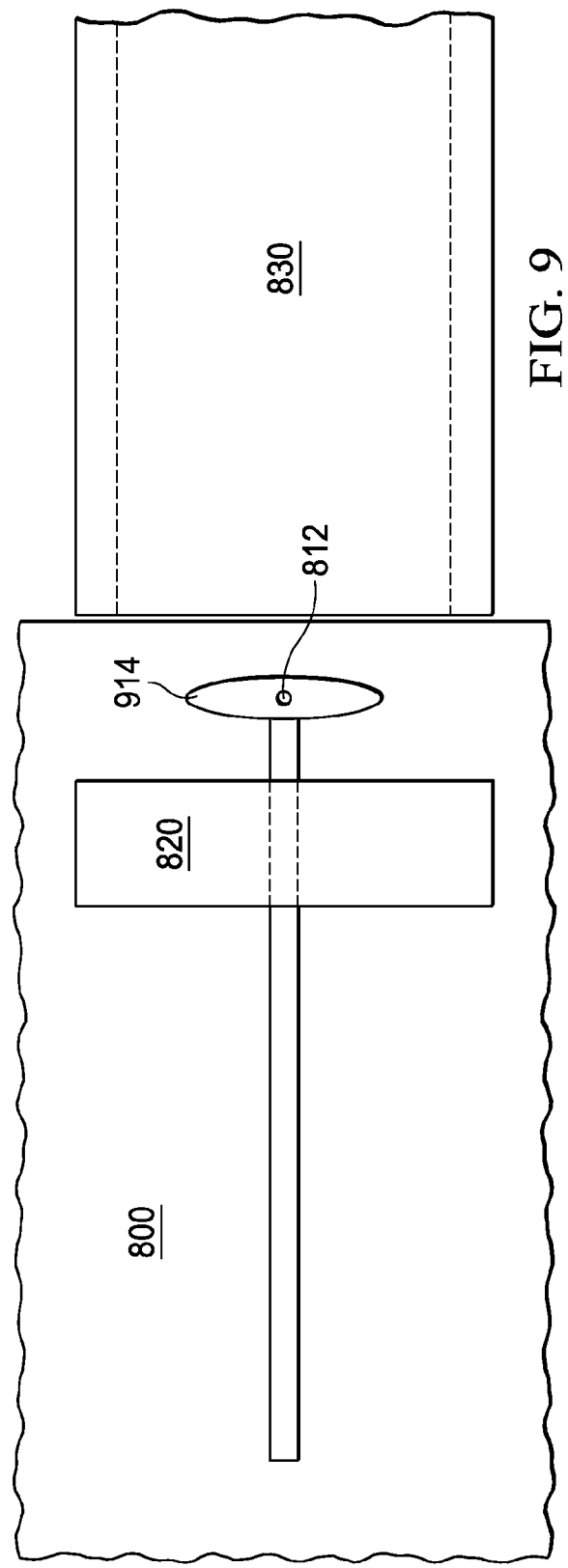

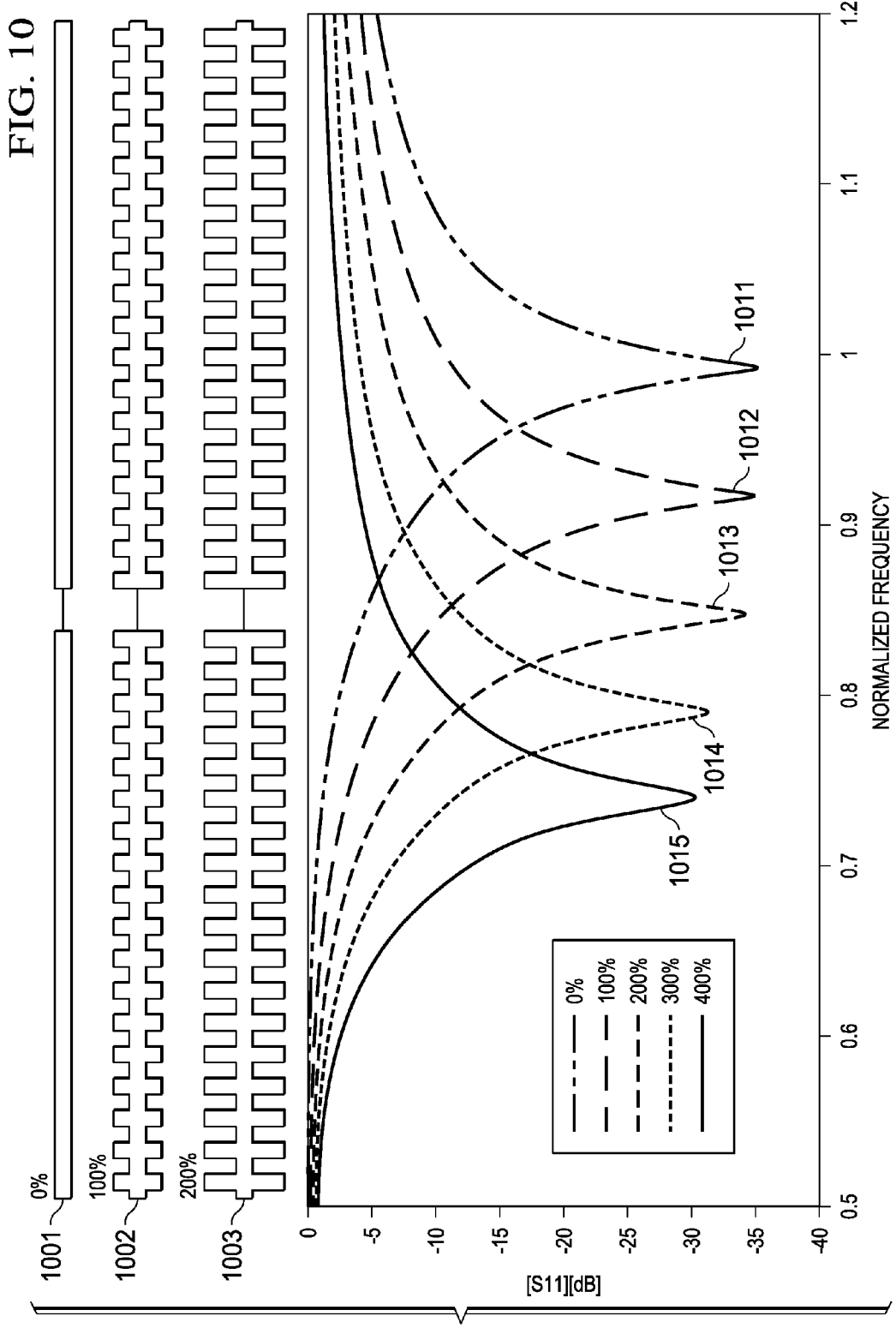

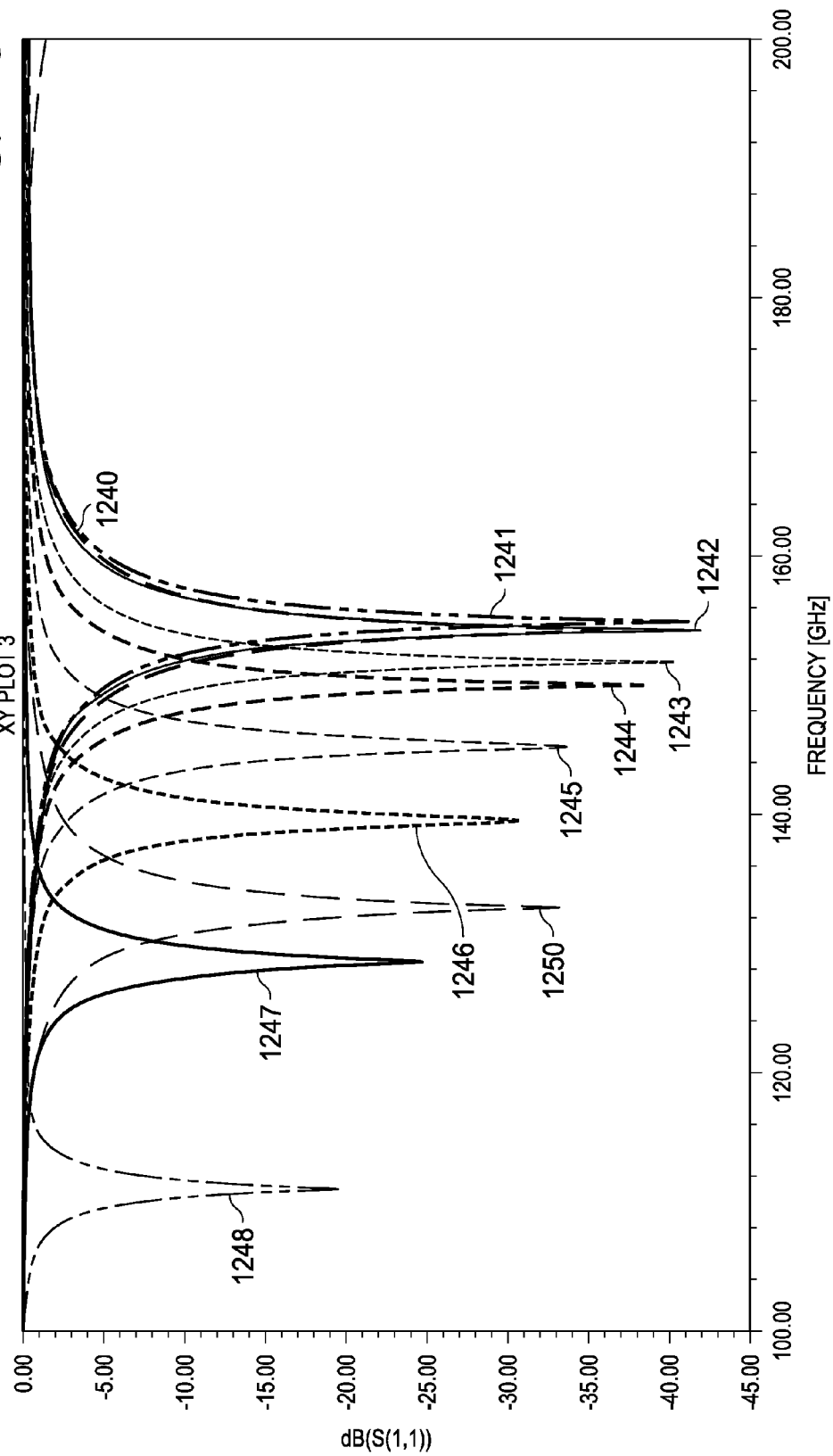

SIMULTANEOUS LAUNCHING OF MULTIPLE SIGNAL CHANNELS IN A DIELECTRIC WAVEGUIDE USING DIFFERENT ELECTROMAGNETIC MODES

CLAIM OF PRIORITY UNDER 35 U.S.C. 119(e)

The present application claims priority to and incorporates by reference U.S. Provisional Application No. 62/164,239 filed May 20, 2015, entitled "Simultaneous Launching of Multiple Signal Channels in a Dielectric Waveguide Using Different Electromagnetic Modes."

FIELD OF THE INVENTION

This invention generally relates to wave guides for high frequency signals, and in particular to structures for launching multiple signals into a dielectric waveguide.

BACKGROUND OF THE INVENTION

In electromagnetic and communications engineering, the term waveguide may refer to any linear structure that conveys electromagnetic waves between its endpoints. The original and most common meaning is a hollow metal pipe used to carry radio waves. This type of waveguide is used as a transmission line for such purposes as connecting microwave transmitters and receivers to their antennas, in equipment such as microwave ovens, radar sets, satellite communications, and microwave radio links.

A dielectric waveguide employs a solid dielectric core rather than a hollow pipe. A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability; which is expressed by a number called the relative permittivity ($\in$k). The term insulator is generally used to indicate electrical obstruction while the term dielectric is used to indicate the energy storing capacity of the material by means of polarization.

Permittivity is a material property that expresses a measure of the energy storage per unit meter of a material due to electric polarization $(J/V^2)/(m)$. Relative permittivity is the factor by which the electric field between the charges is decreased or increased relative to vacuum. Permittivity is typically represented by the Greek letter c. Relative permittivity is also commonly known as dielectric constant.

Permeability is the measure of the ability of a material to support the formation of a magnetic field within itself in response to an applied magnetic field. Magnetic permeability is typically represented by the Greek letter $\mu$.

The electromagnetic waves in a metal-pipe waveguide may be imagined as travelling down the guide in a zig-zag path, being repeatedly reflected between opposite walls of the guide. For the particular case of a rectangular waveguide, it is possible to base an exact analysis on this view. Propagation in a dielectric waveguide may be viewed in the same way, with the waves confined to the dielectric by total internal reflection at its surface.

BRIEF DESCRIPTION OF THE DRAWINGS

Particular embodiments in accordance with the invention will now be described, by way of example only, and with reference to the accompanying drawings:

FIGS. 4A-4D illustrate various electromagnetic modes of a DWG with a rectangular core;

FIGS. 8A, 8B, and 9 illustrate a slow wave fishbone dipole antenna;

FIG. 10 is a plot illustrating simulation of fishbone slow wave arms to determine minimization factor;

FIGS. 12A-12C illustrate a vertical patch antenna with two feeds;

Figure 1:
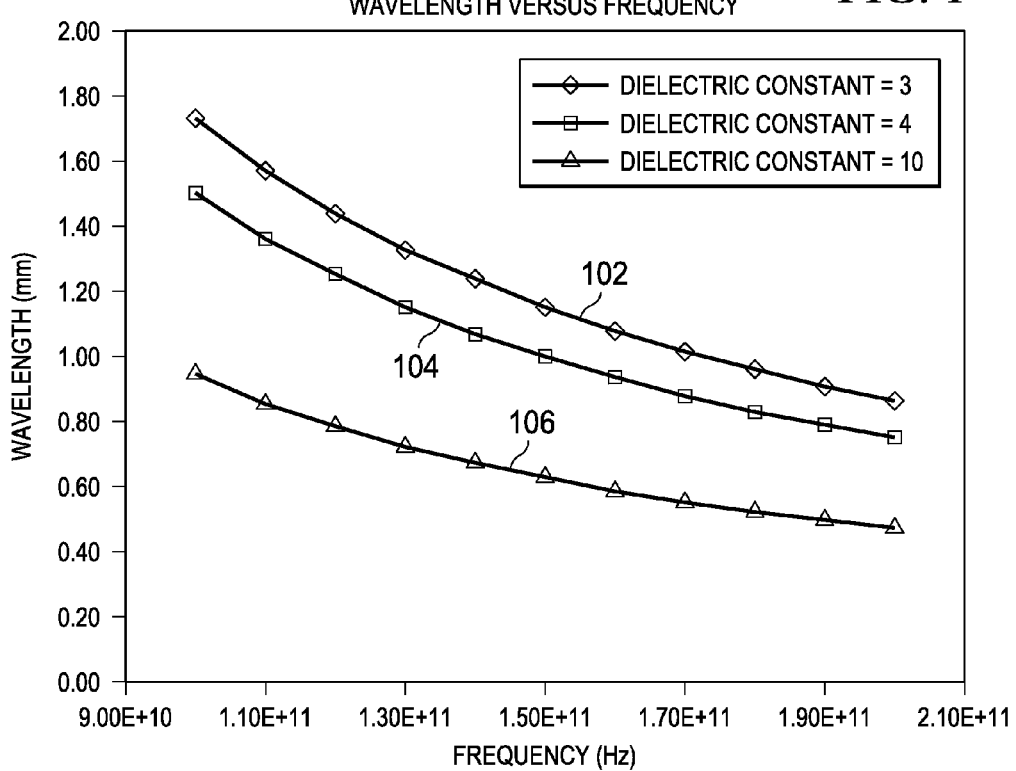
FIG. 1 is a plot of wavelength versus frequency through materials of various dielectric constants.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A dielectric waveguide (DWG) may be used as an interconnect to communicate chip to chip in a system or system to system, for example. In order to maximize the amount of data transmitted, information may be transmitted in different frequencies or channels. Embodiments of this disclosure provide a way to simultaneously launch more than one signal channel into a dielectric waveguide (DWG) using different electromagnetic modes of the DWG, as will be described in more detail below.

As frequencies in electronic components and systems increase, the wavelength decreases in a corresponding manner. For example, many computer processors now operate in the gigahertz realm. As operating frequencies increase into the sub-terahertz realm, the wavelengths become short enough that signal lines that exceed a short distance may act as an antenna and signal radiation may occur. FIG. 1 is a plot of wavelength versus frequency through materials of various dielectric constants. As illustrated by plot 102 which represents a material with a low dielectric constant of 3, such as a typical printed circuit board, a 100 GHz signal will have a wavelength of approximately 1.7 mm. Thus, a signal line that is only 1.7 mm in length may act as a full wave antenna and radiate a significant percentage of the signal energy. In fact, even lines of λ/10 are good radiators, therefore a line as short as 170 um in a printed circuit board may act as a good antenna at this frequency. Wavelength typically decreases in materials with higher dielectric constants, as illustrated by plot 104 for a dielectric constant of 4 and plot 106 for a dielectric constant of 10, for example.

Waves in open space propagate in all directions, as spherical waves. In this way they lose their power proportionally to the square of the distance; that is, at a distance R from the source, the power is the source power divided by R2. A wave guide may be used to transport high frequency signals over relatively long distances. The waveguide confines the wave to propagation in one dimension, so that under ideal conditions the wave loses no power while propagating. Electromagnetic wave propagation along the axis of the waveguide is described by the wave equation, which is derived from Maxwell's equations, and where the wavelength depends upon the structure of the waveguide, and the material within it (air, plastic, vacuum, etc.), as well as on the frequency of the wave. Commonly-used waveguides are only of a few categories. The most common kind of waveguide is one that has a rectangular cross-section, one that is usually not square. It is common for the long side of this cross-section to be twice as long as its short side. These are useful for carrying electromagnetic waves that are horizontally or vertically polarized.

A waveguide configuration may have a core member made from dielectric material with a high dielectric constant and be surrounded with a cladding made from dielectric material with a lower dielectric constant. While theoretically, air could be used in place of the cladding, since air has a dielectric constant of approximately 1.0, any contact by humans, or other objects may introduce serious impedance mismatch effects that may result in signal loss or corruption. Therefore, typically free air does not provide a suitable cladding.

For the exceedingly small wavelengths encountered for sub-THz radio frequency (RF) signals, dielectric waveguides perform well and are much less expensive to fabricate than hollow metal waveguides. Furthermore, a metallic waveguide has a frequency cutoff determined by the size of the waveguide. Below the cutoff frequency there is no propagation of the electromagnetic field. Dielectric waveguides may have a wider range of operation without a fixed cutoff point. However, a purely dielectric waveguide may be subject to interference caused by touching by fingers or hands, or by other conductive objects. Metallic waveguides confine all fields and therefore do not suffer from EMI (electromagnetic interference) and cross-talk issues; therefore, a dielectric waveguide with a metallic cladding may provide significant isolation from external sources of interference. Various types of dielectric core waveguides will be described in more detail below.

Various configurations of dielectric waveguides (DWG) and interconnect schemes are described in US Patent publication number 2014-0287701 filed Apr. 1, 2013, entitled "Integrated Circuit with Dipole Antenna Interface for Dielectric Waveguide" and are incorporated by reference herein. Various antenna configurations for launching and receiving radio frequency signals to/from a DWG are also described therein and are incorporated by reference herein.

Figure 2:
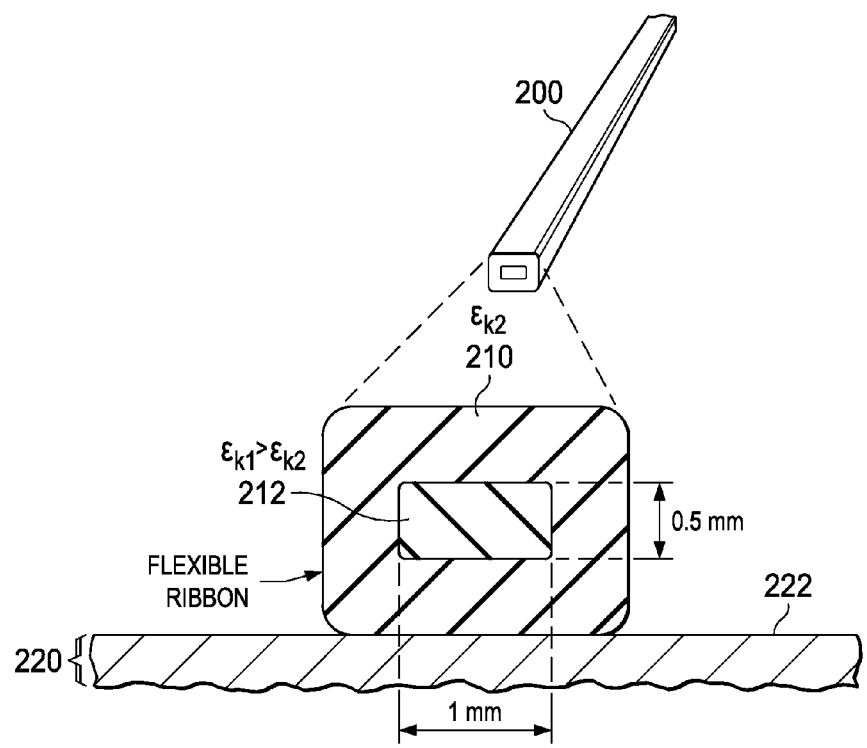
FIG. 2 is an illustration of an example dielectric waveguide.

FIG. 2 illustrates a DWG 200 that is configured as a thin ribbon of a core dielectric material surrounding by a dielectric cladding material. The core dielectric material has a dielectric constant value $\in 1$, while the cladding has a dielectric constant value of $\in 2$, where $\in 1$ is greater than $\in 2$. In this example, a thin rectangular ribbon of the core material 212 is surrounded by the cladding material 210. For sub-terahertz signals, such as in the range of 130-150 gigahertz, a core dimension of approximately 0.5 mm×1.0 mm works well. DWG 200 may be fabricated conformably onto surface 222 of substrate 220 using the inkjet printing process or other 3D printing process, for example. Fabrication of DWGs using 3D printing is described in more detail in U.S. patent application Ser. No. 14/498,837, "Metallic Waveguide with Dielectric Core," Benjamin S. Cook et. al., which is incorporated by reference herein.

In another embodiment, flexible DWG cables may be fabricated using standard manufacturing materials and fabrication techniques. These cable geometries may be built using techniques such as: drawing, extrusion, or fusing processes, which are all common-place to the manufacture of plastics.

In this example, dielectric clad DWG 200 is fabricated on a surface 222 of a substrate 220. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

Electromagnetic Propagation Modes

In general, waveguide propagation modes depend on the operating wavelength and polarization of the signal being transmitted and on the shape and size of the waveguide. The longitudinal mode of a waveguide is a particular standing wave pattern formed by waves confined within the cladding. The transverse modes may be classified into different types:

TE modes (transverse electric) have no electric field in the direction of propagation.

TM modes (transverse magnetic) have no magnetic field in the direction of propagation.

TEM modes (transverse electromagnetic) have neither electric nor magnetic field in the direction of propagation.

Hybrid modes have both electric and magnetic field components in the direction of propagation.

A DWG may support several TE and TM modes, for example, depending on the configuration of the DWG and the frequency of the signal. The various types of TE and TM modes are well known and need not be described in further detail herein; see e.g. "Electronic Waves and Antennas," Chapter 9, Sophocles J. Orfanidis, 1999, which is incorporated by reference herein.

Figure 3:
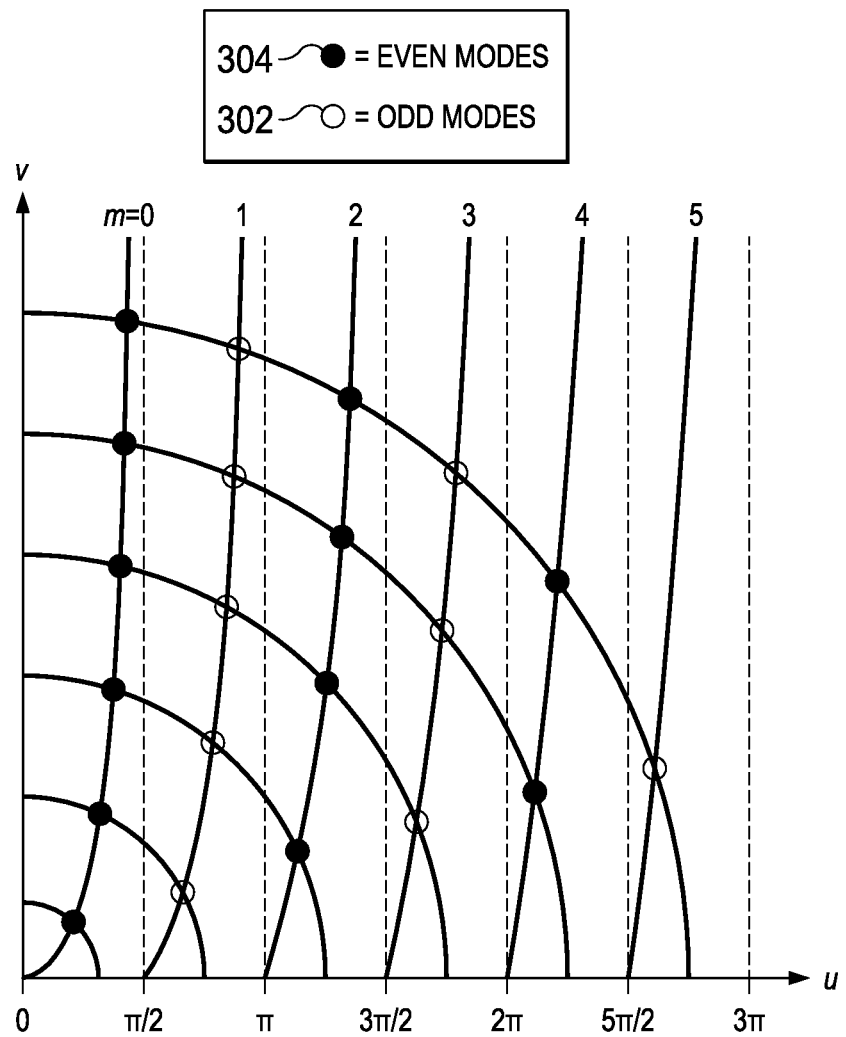
FIG. 3 is a plot illustrating various odd and even TE modes that are possible in a DWG.

FIG. 3 is a plot illustrating various odd TE modes 302 and even TE modes 304 that may exist in a dielectric waveguide similar to DWG 200, referring again to FIG. 2. In FIG. 3, the "v" axis and "u" axis are dimensionless quantities: $u=k_c a$ and $v=\alpha_c a$, where "$k_c$" is the cutoff wave number of the DWG, "a" is one half the transverse width of the DWG, and "$\alpha$" is an attenuation constant for the DWG.

Figure 4A:
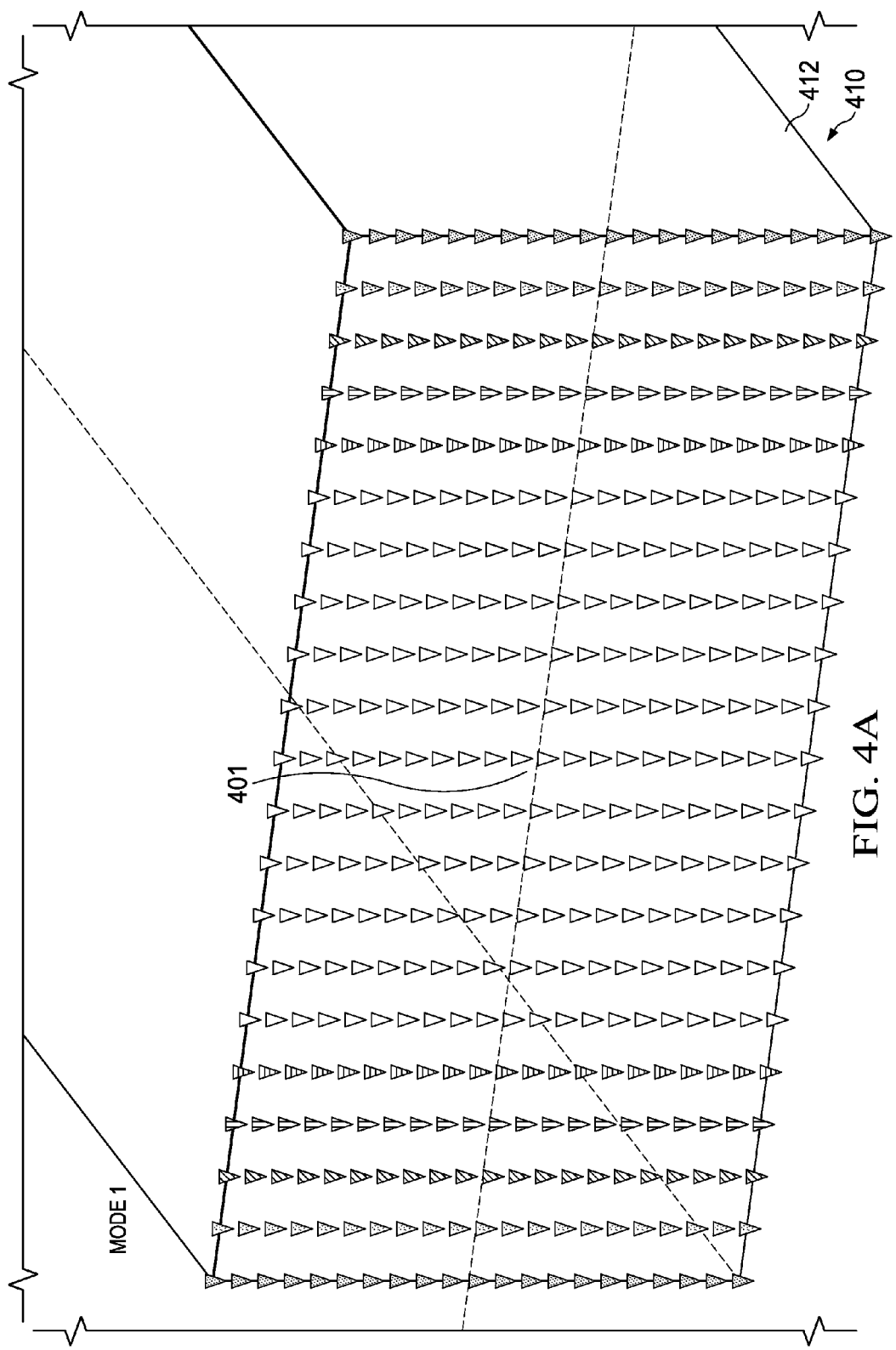
Figure 4B:
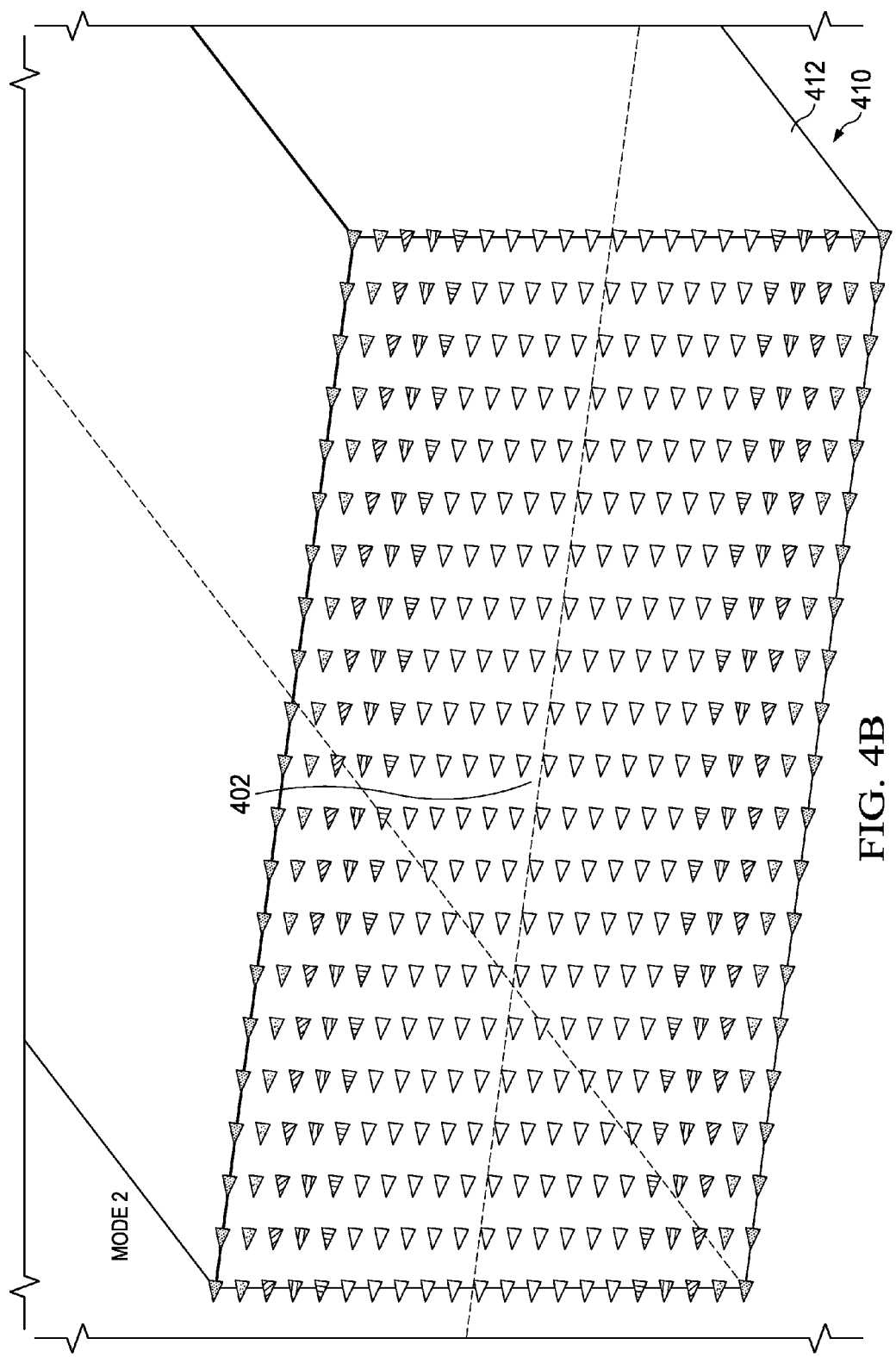
Figure 4C:
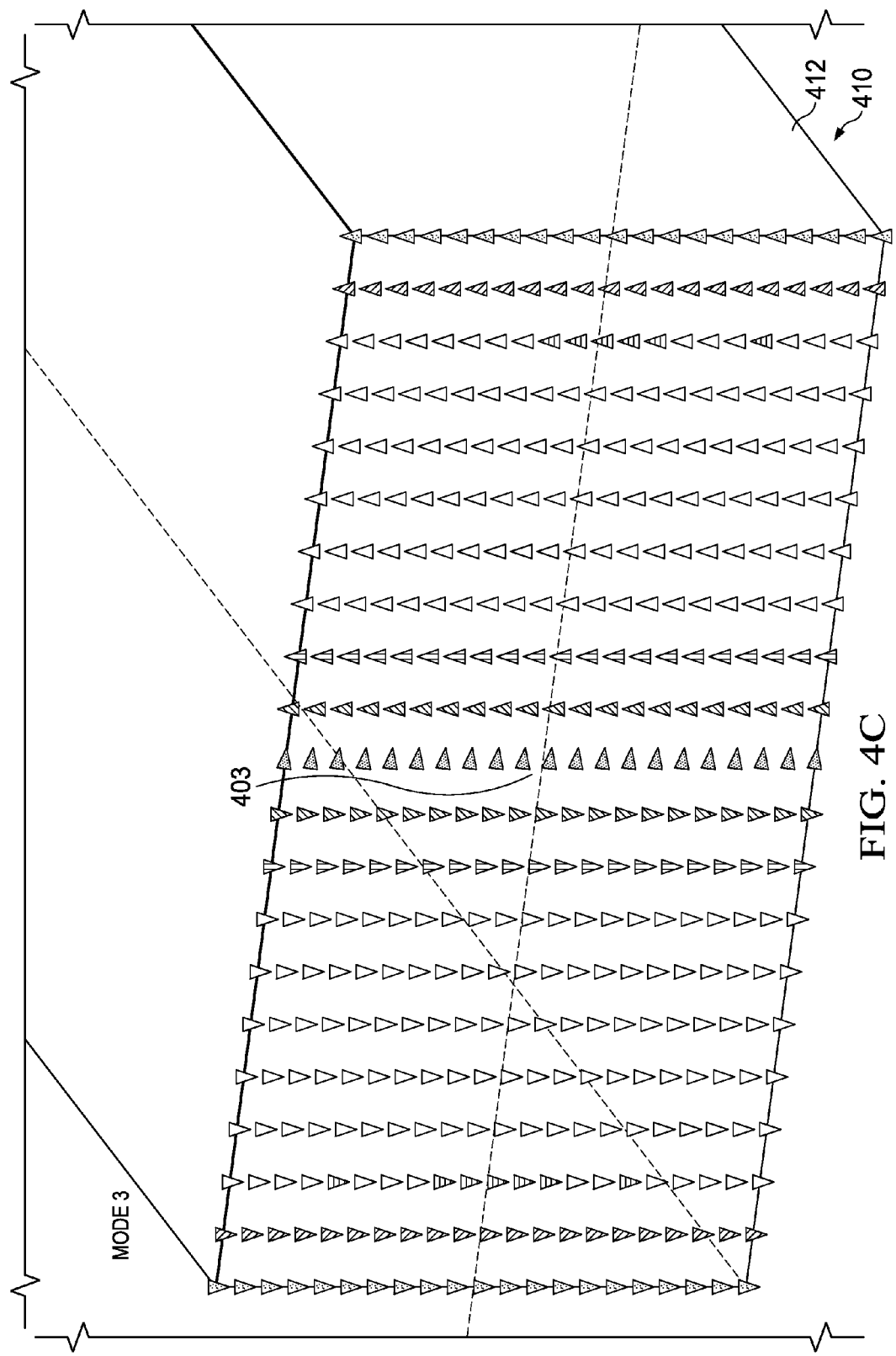

FIGS. 4A-4D illustrate examples of various electromagnetic modes of a DWG with a rectangular dielectric core 412 surrounded by dielectric cladding 410. FIG. 4A illustrates a first mode "1" in which the TE mode is oriented across the short dimension of the DWG and in which the field strength is maximum in the center 401 of the DWG. FIG. 4B illustrates a second mode "2" in which the TE mode is oriented across the long dimension of the DWG and in which the field strength is maximum in the center 402 of the DWG. FIG. 4C illustrates a third mode "3" in which the TE mode is oriented across the short dimension of the DWG and in which the field strength is minimal in the center 403 of the DWG. FIG. 4D illustrates a fourth mode "4" in which the TE mode is oriented across the long dimension of the DWG and in which the field strength is minimal in the center 404 of the DWG.

In order to maximize the amount of information that can be sent through a DWG it is possible to use different electromagnetic modes of the waveguide and send a "channel" of information per mode. Since each mode is orthogonal to the other modes in a given DWG there is typically negligible crosstalk between the modes. Thus, each of these modes is independent from each other and may be used as different "channels" of communication. Referring to FIGS. 4D-4D, four channels of information may be transmitted simultaneously using the four modes 1-4 illustrated therein.

Figure 5:
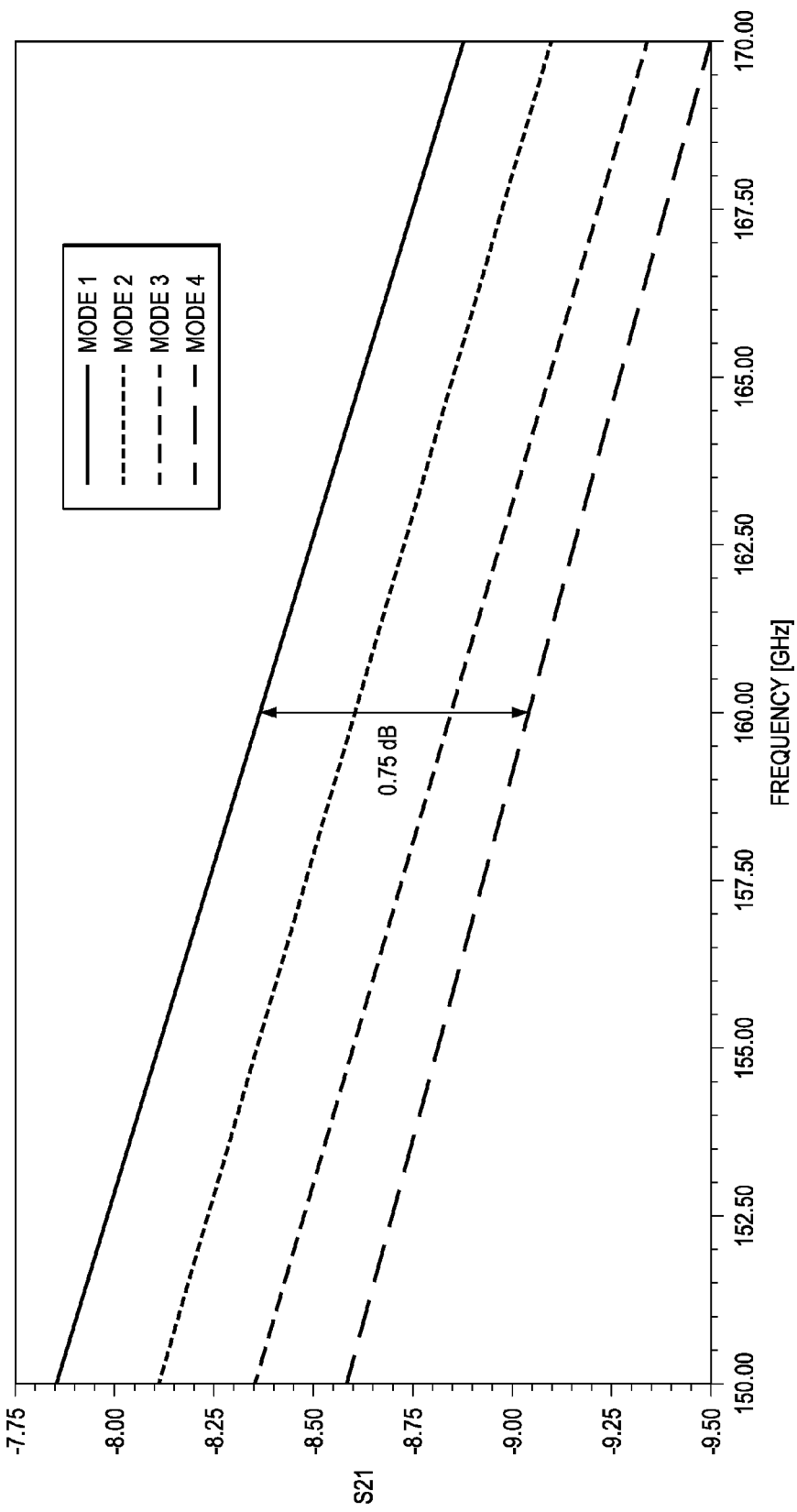
FIG. 5 is a plot illustrating relative strength of the various modes illustrated in FIGS. 4A-4D.

FIG. 5 is an s-plot illustrating the relative strengths of the four modes illustrated in FIGS. 4A-4D when a sinusoidal signal is sent through the DWG. The x-axis represents frequency in GHz, and the y-axis represents signal insertion loss in dB between the input port "1" and the output port "2" of a 50 cm length of DWG. As can be seen, all the modes have comparable strengths, with a maximum difference of 0.75 dB between mode 1 and mode 4. Thus, all the modes are strong enough to support a communication channel.

Figure 6:
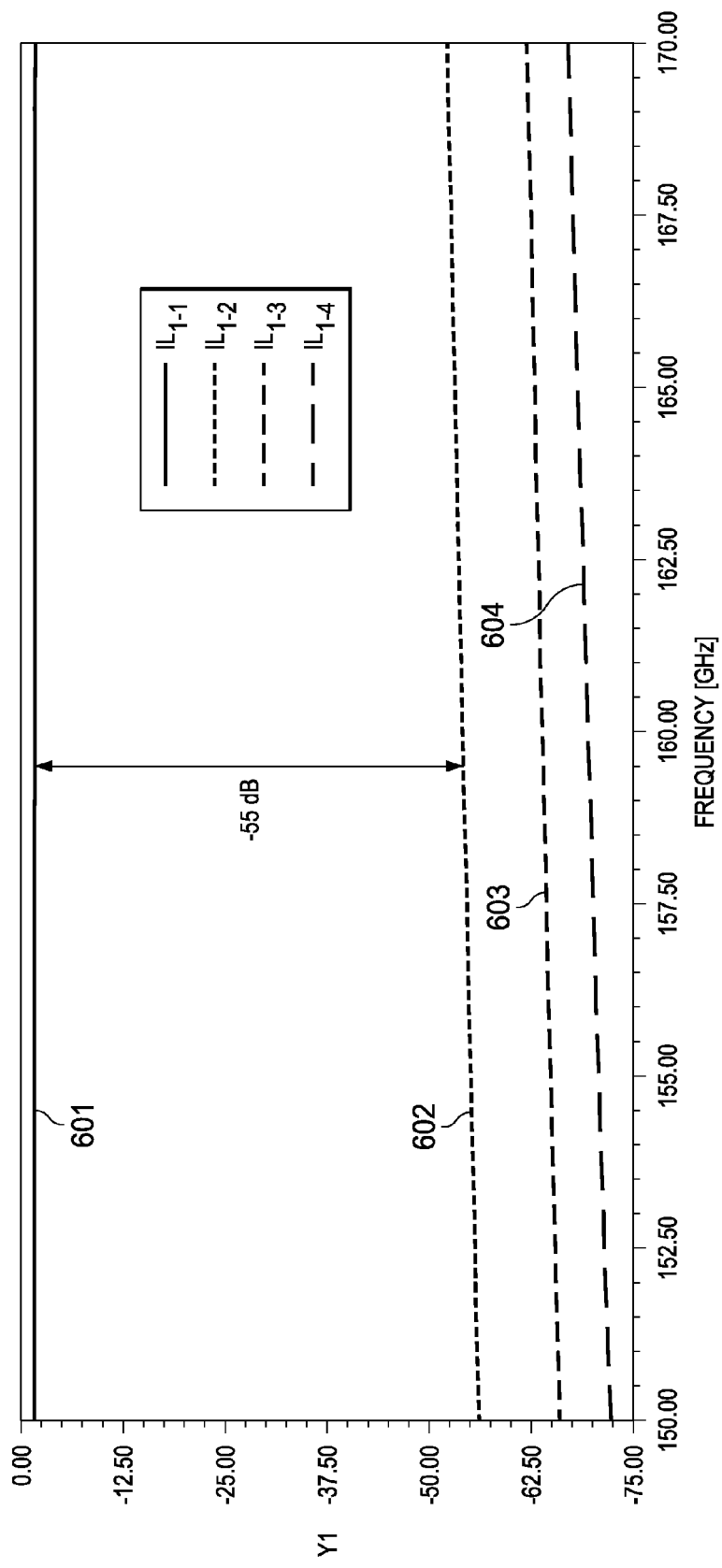
FIG. 6 is a plot illustrating cross talk between the modes illustrated in FIGS. 4A-4D.

FIG. 6 is a plot illustrating cross talk between mode 1 and the other modes illustrated in FIGS. 4A-4D. A potential problem with simultaneous use of multiple modes within a DWG could be the transfer of signal strength between modes which could lead to 'cross talk' problems. The x-axis represents frequency in GHz, and the y-axis represents signal insertion loss in dB between the mode 1 as input port "1" in plot 601 and each of the other three modes 2-4 as the output port "2" in plots 602-604, respectively, for a 50 cm length of DWG. FIG. 6 shows that the insertion loss between mode 1 and the rest of the modes is high and therefore the cross talk is very small and lower than −55 dB. Typically, a communication system specification may specify an isolation of at least −30 dB between signal channels, for example.

Thus, it is clear that if excited properly each mode can transmit a signal through the waveguide without "cross talk" with the other modes.

Launching Options

Figure 7:
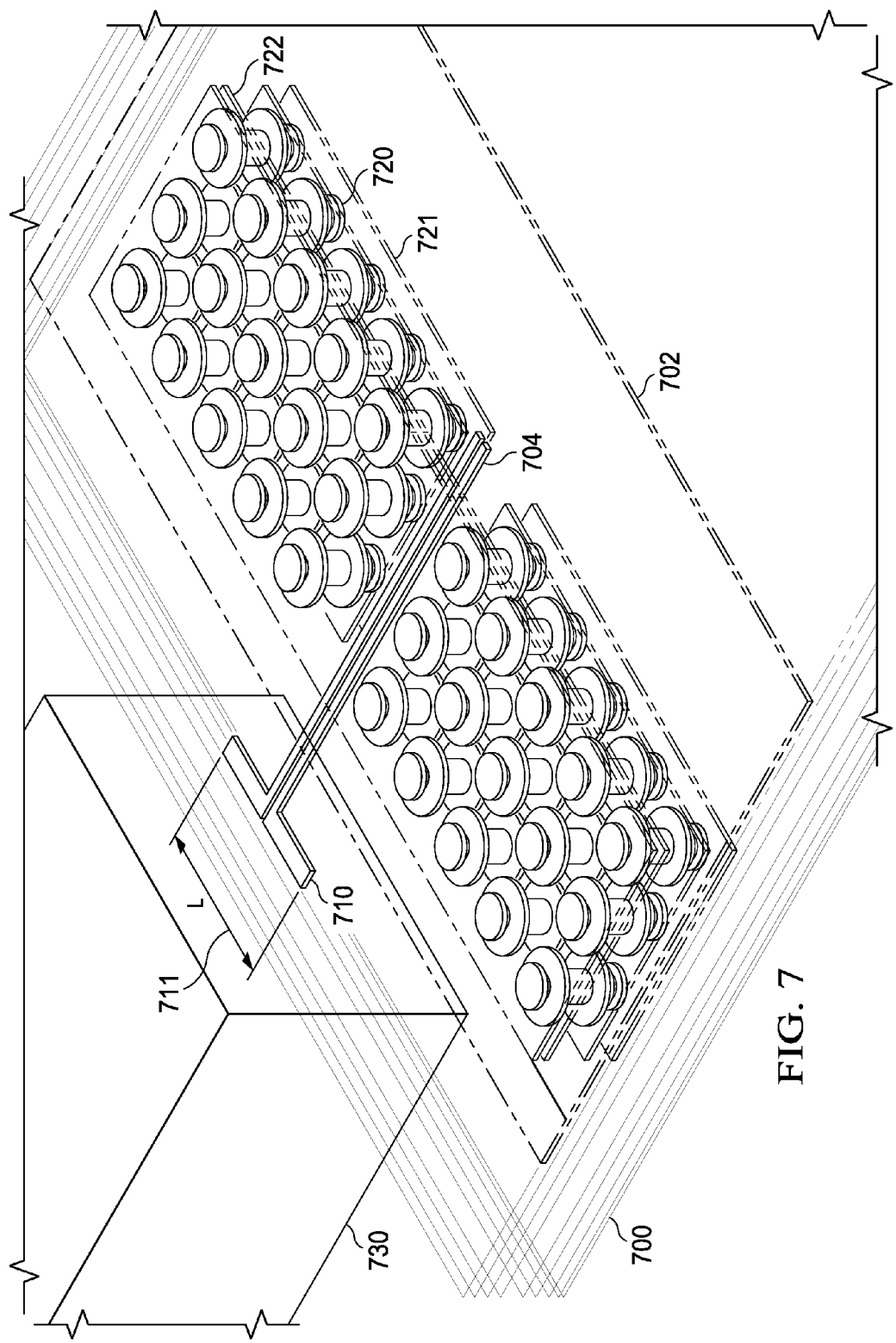
FIG. 7 is an isometric view of a dipole antenna configured to launch a signal into a DWG.

FIG. 7 is an isometric view of a dipole antenna 710 formed within a multilayer substrate 700 and configured to launch a signal into a DWG 730. One way to excite mode 2, (referring to FIG. 4B, 402) for example, is to use a horizontal dipole antenna as illustrated in FIG. 7. Differential signal lines 704 connect the dipole antenna 710 to an integrated circuit (IC) (not shown) mounted on substrate 700 that is generating or receiving a sub-terahertz high frequency signal. Differential signal lines have a specified cross-section and are spaced apart from ground plane 702 by a controlled amount to form a characteristic impedance. Typically, the characteristic impedance is designed to be approximately 50 ohms; however, other embodiments may use a different characteristic impedance that is optimized for a particular application.

Ground plane 702 orients a signal launched from dipole antenna 710 in a direction towards DWG 730, but also in a direction away from DWG 730. Reflector 720 is an array of metalized vias between two coplanar reflector plates 721, 722 that are above and below the plane that holds the dipole antenna 710. In some embodiments, there may be one or more additional reflector plates coupled to the array of vias and running essentially parallel to the dipole antenna in the same plane as the dipole antenna. Additional parallel reflector plates may be added on other layers, if present. The goal is to erect an essentially vertical metallic "wall" that reflects radiated energy from dipole antenna 710 back towards DWG 730. The vias may be connected to ground, or may be left floating. The metal structure acts a "short" to the radiated field from the dipole antenna. Spacing the metal reflector structure approximately one half of a wavelength from the dipole antenna provides an optimum amount of reflection. Alternatively, the reflector structure may be placed a distance of 1.5, 2.5, etc wavelengths from the dipole antenna. While a distance of one half wavelength may be optimum, a distance in the range of 0.3-0.7 or multiples thereof provides a useful amount of reflection. This implementation is described in further detail in US Patent Application publication 2014-0287701, filed Apr. 1, 2013, and entitled "Integrated Circuit with Dipole Antenna Interface for Dielectric Waveguide" which is incorporated by reference herein.

The total length 711 of both arms of dipole antenna 710 may be approximately $\lambda/2$, where $\lambda$ is the effective wavelength corresponding to the mix of dielectric material and air the antenna is affecting. Since substrate 700 is very wide in the x-y plane there is no problem in implementing this dipole antenna. The length 711 of the antenna should be approximately 0.6 mm long for the dipole antenna to resonate at 140 GHz, which is not a problem to implement within substrate 700.

Fishbone Dipole Antenna

Referring again to FIG. 4A, excitation of mode 1 using a dipole antenna may require an antenna with arms extending in the z-direction with an approximate length of 0.6 mm. for a 140 GHz signal. Since a typical multilayer substrate is only approximately 0.3 mm thick, a different design may be needed. However, as frequencies continue to increase, simple vertical dipole antennas fabricated within a substrate may be possible.

FIGS. 8A, 8B, and 9 illustrate the design of a dipole antenna 810 implemented in the z-direction of a substrate 800 in order to excite mode 1 of a DWG 830. In this example, slow wave fishbone ribs 814-817 are provided that reduce the effective length of the antenna for a given resonance frequency. In this manner, a dipole antenna may be miniaturized in order to fit in the reduced thickness of the substrate.

FIG. 8A is a side view of multilayer substrate 800, while FIG. 8B is a top view of substrate 800. Differential feed line 804, 805 transports a signal from a transmitter (not shown) that is mounted on substrate 800 that is generating or receiving a sub-terahertz high frequency signal. Differential signal lines 804, 805 have a specified cross-section and are spaced apart from ground plane 802 by a controlled amount to form a characteristic impedance. Typically, the characteristic impedance is designed to be approximately 50 ohms;

however, other embodiments may use a different characteristic impedance that is optimized for a particular application.

Dipole antenna 810 includes two arms 812, 813 that are formed by plated through holes in several layers of multilayer substrate 800 and that are connected to feed lines 804, 805 respectively. Slow wave fishbone ribs 814-817 are formed as rings around and coupled to the two arms 812, 813. The rings may be formed by etching a conductive layer that is on each of the layers that form multilayer substrate 800, for example.

Substrate 840 may be used to provide a "platform" onto which substrate 800 and DWG 830 are mounted. In some embodiments, substrate 840 may be entirely passive; in other embodiments, substrate 840 may have multiple layers that include various signal and/or power layers, for example. Substrate 800 may include multiple conductive signal layers and/or power layers. One or more integrated circuits may be mounted on multilayer substrate 800, for example.

FIG. 9 illustrates another type of fishbone rib 914. In this example, the ribs 914 are elongated rather than round and oriented parallel to the edge of substrate 800 that interfaces to DWG 830. Various embodiments may implement ribs having other shapes and orientations, such as: straight or curved stubs, elliptical, star, etc.

Ground plane 802 orients a signal launched from dipole antenna 810 in a direction towards DWG 830, but also in a direction away from DWG 830. A reflector structure 820 similar to that described above with regards to FIG. 7, 720 may be provided for fishbone dipole antenna 810.

The idea behind a "slow wave structure" antenna is to make regular, spatially periodic, variations in the rod geometry. This serves to lower the wave velocity and therefore the antenna length (size) at resonance for a given frequency. An example slow wave fishbone arms antenna structure is described in more detail in "Inkjet Printing of Novel Wideband and High Gain Antennas on Low-Cost Paper Substrate," Benjamin S. Cook and Atif Shamim, 2012, (Cook) which is incorporated by reference herein. Slow wave structures on a dipole arm are an effective minimization technique for a log-periodic dipole array. Miniaturizations of over 25% in dipole arm width have been demonstrated which translate into similar miniaturizations on the log periodic width.

FIG. 10 is a plot illustrating simulation of fishbone slow wave arms similar to 814-817 to determine a minimization factor. The plot shows the return loss of a dipole antenna and how the introduction of the fishbone ribs reduces the effective resonant frequency of the antenna. The fishbone arms have been demonstrated in miniaturizing a slot antenna while introducing minimal cross polarization by slowing the wave travelling along the dipole. The miniaturization caused by introducing the slow wave fishbone ribs on the dipole arms may be quantified using CST Microwave Studio's finite difference time domain (FDTD) solver to simulate the resonant frequency while the length of the ribs is extended from 100%-400% of the dipole arm width, keeping the dipole length constant. For example, dipole antenna 1001 is the baseline antenna. Dipole antenna 1002 has ribs that are approximately as long as the width of the arm. Dipole antenna 1003 has ribs that have a length of approximately 200% the width of the arm. Dipole antennas having ribs that have a length of approximately 300% and 400% the width of the arm (not shown) are also simulated.

The simulation results shown in FIG. 10 illustrate the resonate frequency of each dipole antenna, normalized to the resonant frequency of the base antenna 1001, shown at 1011. The resonant frequency for the 100% rib length antenna 1002 is shown at 1012. Similarly, the resonant frequency for the 200%, 300%, and 400% rib length antennas are shown at 1013, 1014, and 1015 respectively. As illustrated by point 1015, more than a 25% reduction in resonant frequency is achieved by increasing the ribs to 400% of arm width. The dipole gain varies by only 0.2 dB between the original dipole with no slow wave structures and the dipole with the highest miniaturization factor. This means minimal impact occurs on dipole pattern and performance from the introduction of slow wave structures.

In this manner, a shorter dipole antenna may be used when ribs are added so that a 140 GHz dipole antenna 810 (referring back to FIG. 8A) may be fabricated in the z direction within substrate 800 to produce excitation of mode 2 within DWG 830.

Figure 11:
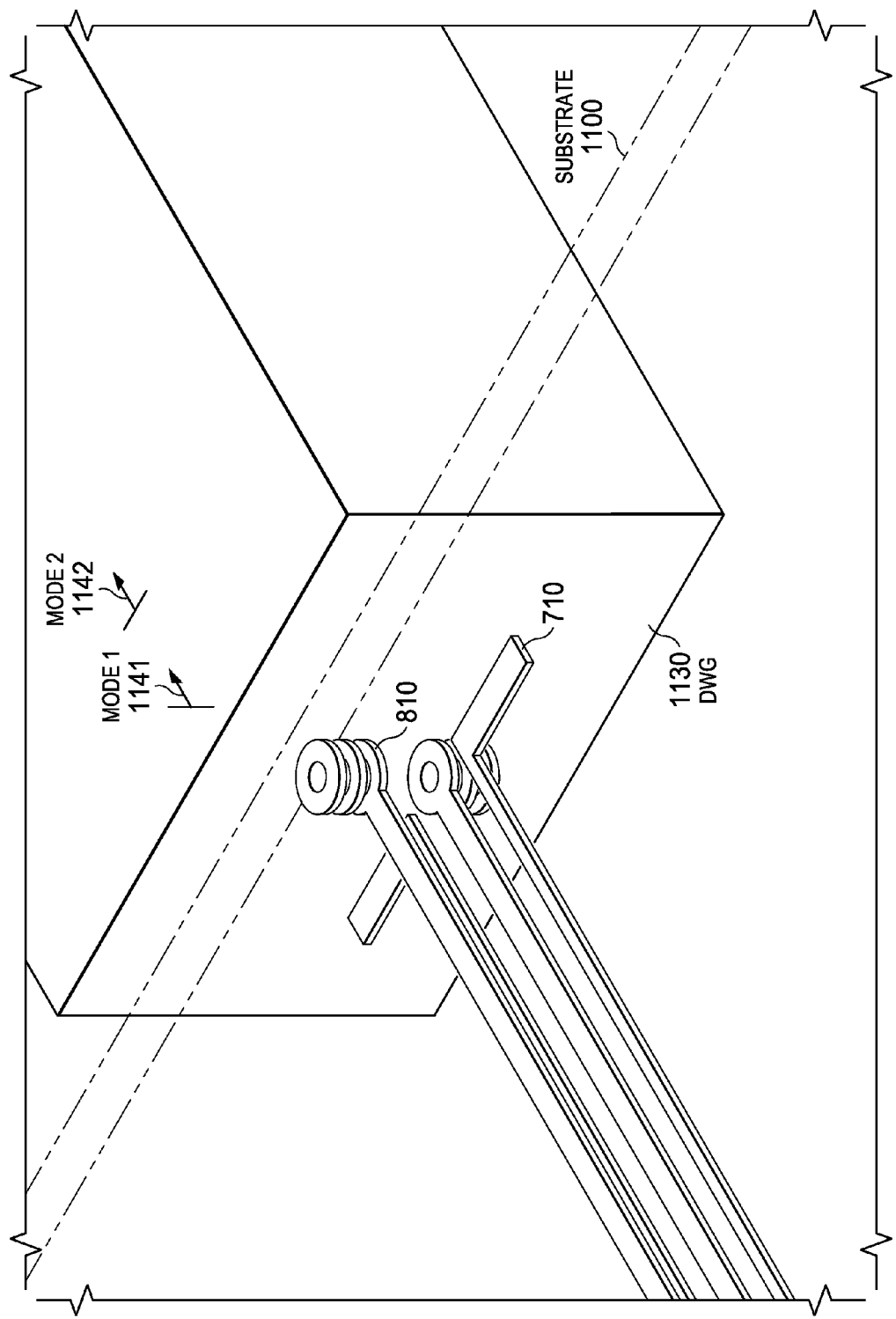
FIG. 11 illustrates a vertical slow wave fishbone and a horizontal dipole antenna in a same substrate.

FIG. 11 illustrates a vertical slow wave fishbone antenna 810 and a horizontal dipole antenna 710 in a same substrate 1100 that allow simultaneous excitation of mode 2 1142 by horizontal dipole antenna 710 and excitation of mode 1 1141 by vertical slow wave fishbone antenna 810 of DWG 1130. This allows two channels of information to be transmitted simultaneously from a transmitter mounted on substrate 1100 through DWG 1130, as described above in more detail.

Figure 12A:
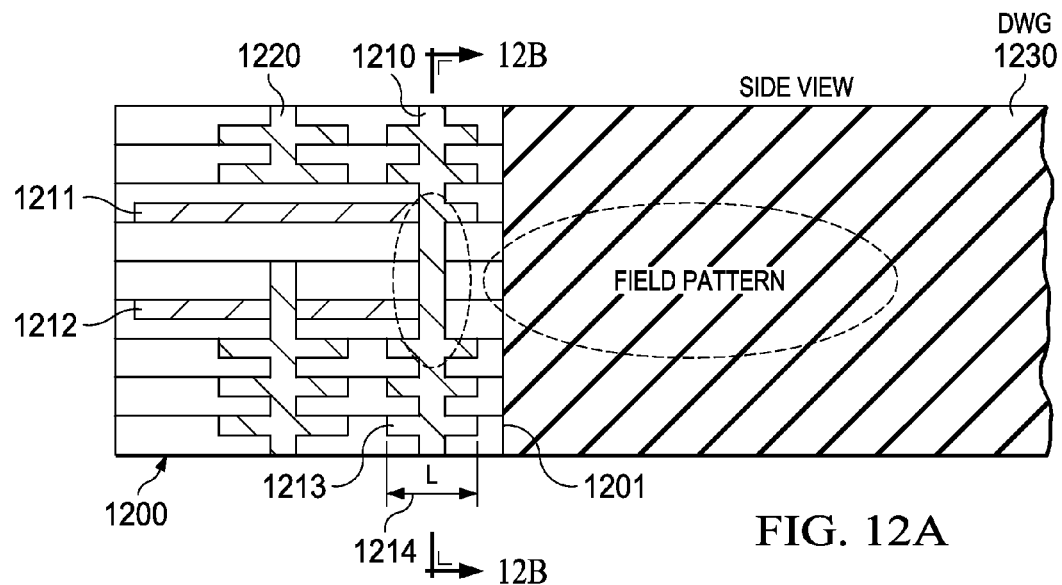
Figure 12B:
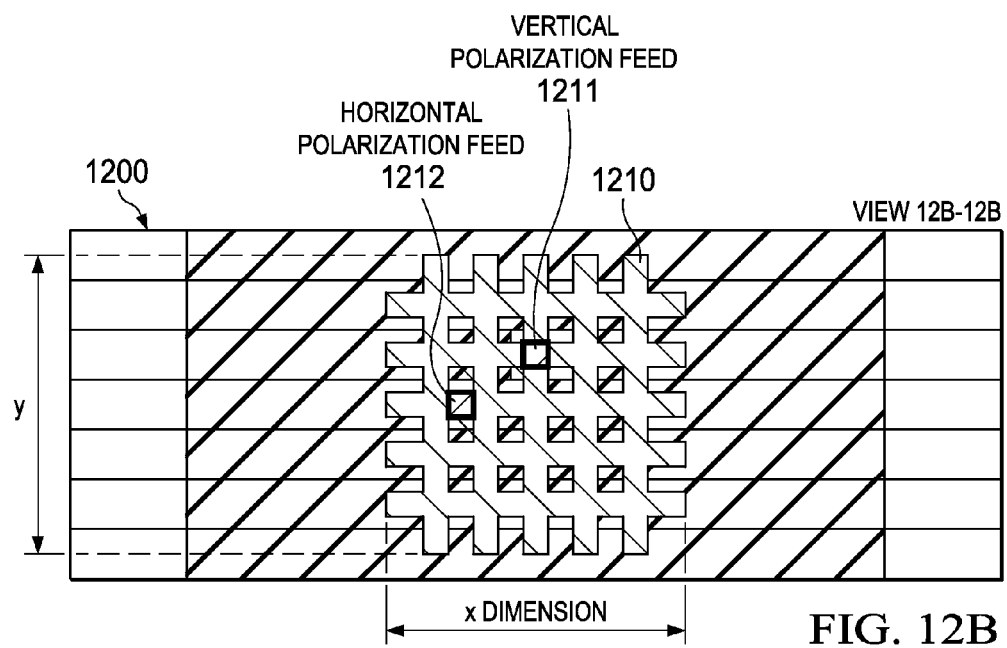

FIGS. 12A-12B illustrate a vertical fishbone patch antenna 1210 with two feeds 1211, 1212 formed within a multilayer substrate 1200. FIG. 12A illustrates a side view of multilayer substrate 1200 with DWG 1230 mounted adjacent an interface edge 1201 of substrate 1200. FIG. 12B illustrates a section view through substrate 120 in the same axis as that of DWG 1230. Patch antenna 1210 is essentially a row and column grid that is oriented parallel to interface edge 1201, which is an edge of substrate 1200.

Patch antenna 1210 may be fabricated using a set of plated through holes in a similar manner to fishbone antenna 810, referring to FIGS. 8A, and 8B. In this case, multiple columns of plated through holes may be interconnected with conductive pads on each layer of multilayer substrate 1200, for example. The size of the pads may be varied to form fishbone ribs that will tend to change the resonant frequency of the patch antenna.

A horizontal polarization feed line 1211 may be connected to a pad between two of the columns of through holes and used to excite mode 2 (referring to FIG. 4B) in DWG 1230. Similarly, a vertical polarization feed line 1212 may be connected to a one of columns of through holes and used to excite mode 1 (referring to FIG. 4A) in DWG 1230. (Reflector 1220 may be implemented in a similar manner to reflector 720, for example.

Horizontal polarization feed line 1211 and vertical polarization feed line 1212 may be driven by a transmitter (not shown) that is mounted on substrate 1200. Various additional blocks of logic (not shown) may also be coupled to the transmitter for generating or processing data that is sent or received via the multiple channels in DWG 1230.

The FIG. 12C is a plot illustrating simulation of the vertical fishbone patch antenna 1210 with different size fishbone ribs. Various embodiments of antenna 1210 are simulated with different rib lengths "L" 1214, referring back to FIG. 12A. Plot lines 1240-1247 are simulations of a patch antenna 1210 having an x dimension of 1.0 mm and a y dimension of 0.85 mm. Plot line 1240 illustrates an antenna with no fishbone ribs. Plot line 1241 illustrates the performance of patch antenna 1210 with 10 um ribs. Plot line 1242 illustrates the performance of patch antenna 1210 with 20 um ribs. Similarly, plot lines 1243-1247 illustrates the performance of patch antenna 1210 with 30, 40, 50, 60, and 70 um ribs, respectively. As can be seen, the resonant frequency is reduced from approximately 155 GHz with no ribs to approximately 110 GHz with 70 um ribs, which is a greater than 30% reduction. This provides an unexpected improvement in antenna size reduction.

Plot line 1250 is a simulation of a patch antenna having an x dimension of 1.0 mm and a y dimension of 1.0 mm, with no ribs.

Figure 13:
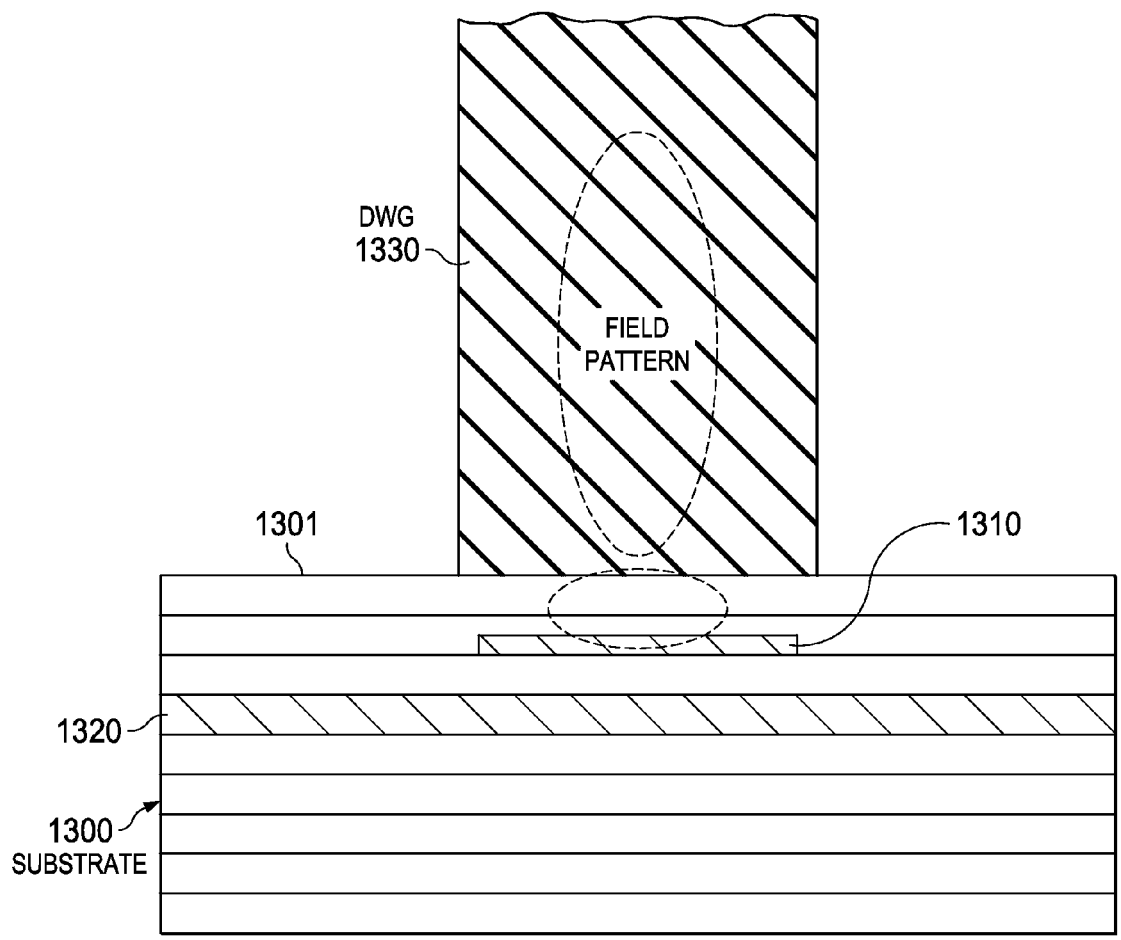
FIG. 13 illustrates a horizontal patch antenna with two feeds.

FIG. 13 illustrates a horizontal patch antenna 1310 with two feeds formed within a multilayer substrate 1300. FIG. 13 illustrates a side view of multilayer substrate 1300 with DWG 1330 mounted adjacent an interface edge 1301 of substrate 1300. Patch antenna 1310 is essentially a row and column grid that is oriented parallel to interface surface 1301, which is a top surface of substrate 1300 in this example. An end of DWG 1330 is mounted so as to be roughly centered over patch antenna 1310. Ground plane 1320 acts as a reflector for patch antenna 1310.

Patch antenna 1310 may be fabricated on a conductive layer of substrate 1300 to form a grid of multiple columns and rows similar to patch antenna 1210 in FIG. 12, for example.

A horizontal polarization feed line (not shown) may be connected to a row between two of the columns of patch antenna 1310 and used to excite mode 2 (referring to FIG. 4B) in DWG 1330. Similarly, a vertical polarization feed line (not shown) may be connected to a one of columns of patch antenna 1310 and used to excite mode 1 (referring to FIG. 4A) in DWG 1330.

The horizontal polarization feed line and vertical polarization feed line may be driven by a transmitter (not shown) that is mounted on substrate 1300. Various additional blocks of logic (not shown) may also be coupled to the transmitter for generating or processing data that is sent or received via the multiple channels in DWG 1330.

Figure 14:
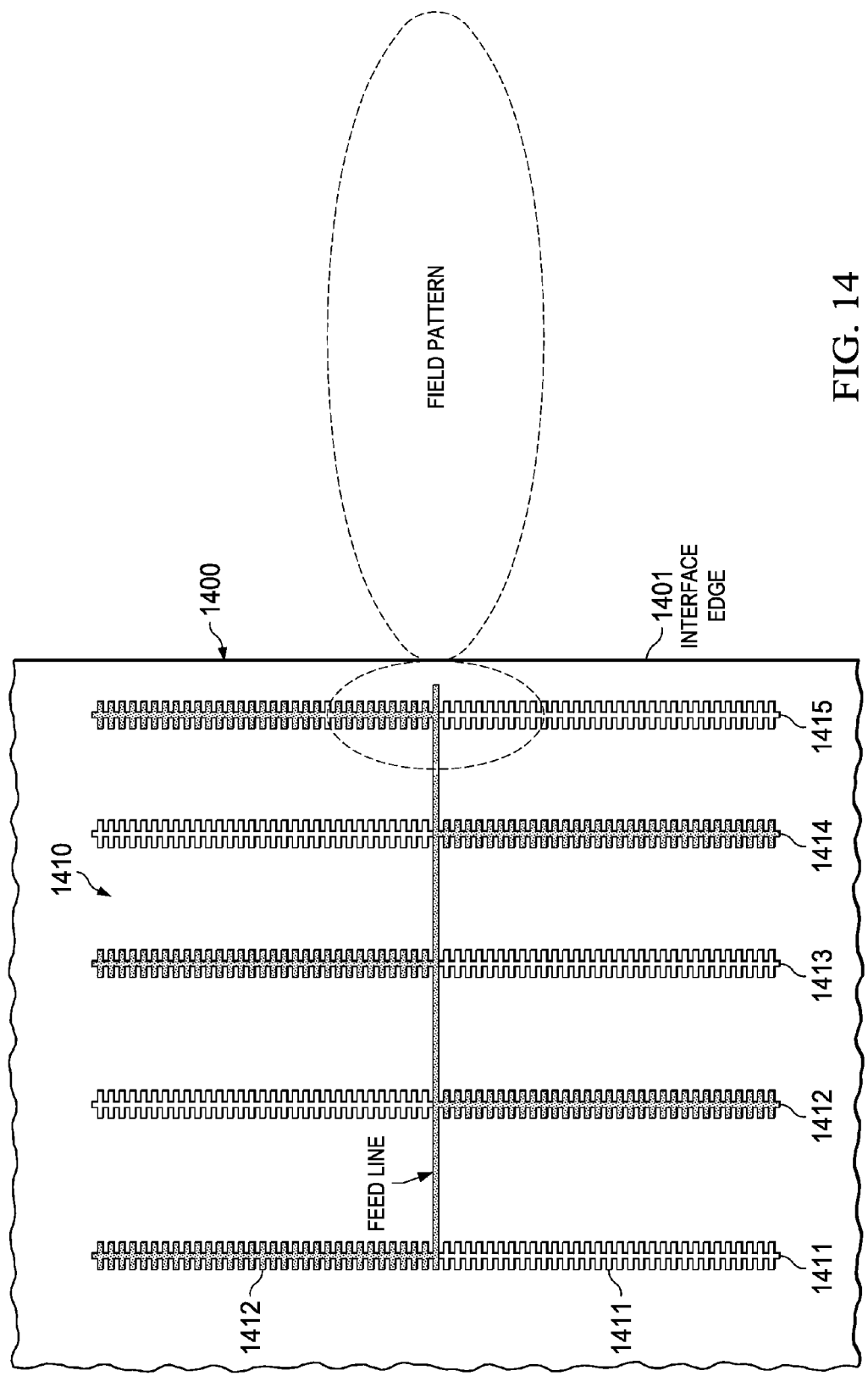
FIG. 14 illustrates a horizontal directive structure.

FIG. 14 illustrates a horizontal directive structure 1410 that may be formed on a single conductive layer of a multilayer substrate 1400. In this example, structure 1410 is a log periodic antenna that uses slow wave fishbone arms to reduce the size of the antenna, as discussed above in more detail. Alternatively, straight dipole arms may be used to form an antenna that will be larger in size for a same frequency. The multiple arms provide directivity towards interface edge 1401 and may eliminate the need for a separate reflector structure. A detailed description of the design of a log periodic antenna is provided by Cook. The process is briefly described below.

To design a log periodic antenna using slow wave dipole arms, the design parameters σ, the relative spacing between elements, and τ, the ratio of lengths between adjacent arms are optimized to achieve a required spacing for directivity and bandwidth. Equation (1) relates σ and τ to the angle at which the arms converge to an apex.

$$\cot(\alpha) = 4\sigma/(1-\tau) \quad (1)$$

Arm length may then be determined using equation (2) where $L_n$ is the length of the nth arm. The value of $L_1$ in this equation, the dipole with the lowest operating frequency, is the length of a slow wave dipole corresponding to the lowest operating frequency of the log-periodic antenna, and may be found via simulation. From $L_1$ and the value of τ, the subsequent arm lengths may be calculated using equation (2)

$$\tau = L_{n+1}/L_n \quad (2)$$

From these values, the arm spacing may be determined using equation (3).

$$d_{1,2} = \frac{1}{2}(L_1 - L_2)\sigma \quad (3)$$

One set of arms, such as those indicated at 1412, may be placed on one conductive layer with a differential stripline center conductor. Alternate arms, such as 1411, 1413, 1415 may be located on another conductive layer in which the center conductor is also a differential stripline.

Figure 15A:
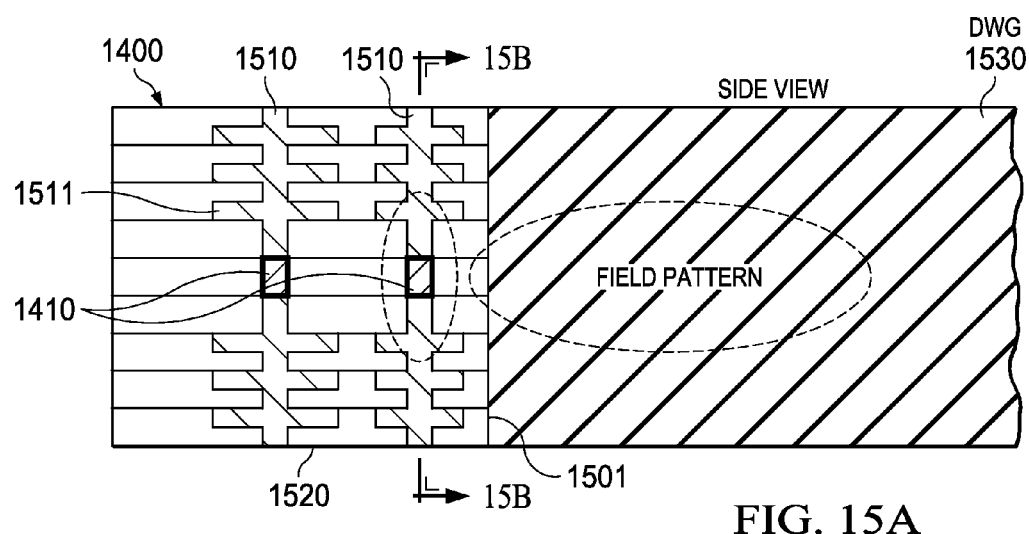
FIGS. 15A-15B illustrate directive vertical and horizontal structures.
Figure 15B:
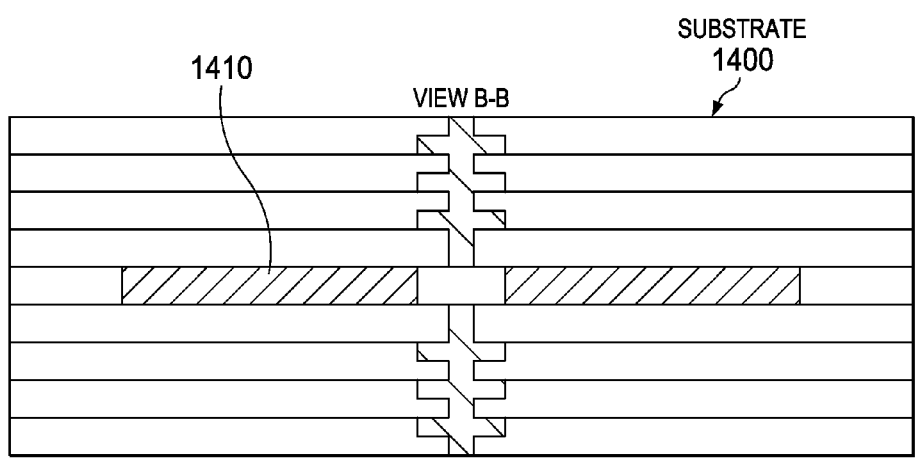

FIGS. 15A-15B illustrate directive horizontal structure 1410 and directive vertical structure 1510. Horizontal log periodic antenna 1410 may be formed on one conductive layer of multilayer substrate 1400 as described above with reference to FIG. 14.

A vertical log periodic antenna 1510 may be formed within multilayer substrate 1400 in a similar manner as was described for slow wave fishbone antenna 810 with reference to FIG. 8A. Multiple arms of antenna 1510 may be formed based on spacing parameters determined using equations (1)-(3), for example. However, due to the thickness constraint of the substrate, the arms may need to be constrained to have a length that is less than the thickness of the substrate.

Figure 16:
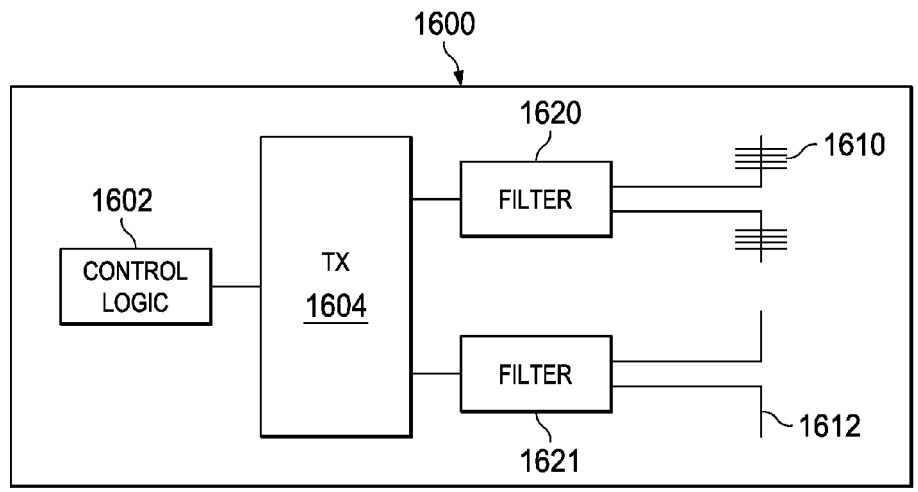
FIG. 16 is a block diagram illustrating a device with two signal launching structures.

FIG. 16 is a block diagram illustrating a device 1600 with two signal launching structures 1610 and 1612. Signal launching structures 1610, 1612 may be similar to those described herein for vertical and horizontal structures for excitation of mode 1 and mode 2 in a DWG that may be mounted in proximity to an interface edge of a substrate in which the structures are formed.

A transmitter 1604 may generate two separate streams of data that may then be provided to a separate antenna structure. For example, transmitter 1604 may perform FDD (frequency domain duplexing/multiplexing) where the orthogonal modes of the waveguide operate at different frequencies, and multiple launching structures feed those modes based on the frequency content. Filters 1620, 1621 may be used to separate the data streams based on frequency.

In another embodiment, transmitter 1604 may produce in-phase and quadrature (I/Q) multiplexing where the I channel is coupled to one of the launching structures to excite one mode of the waveguide, and the Q channel is coupled to the other launching structure to excite an orthogonal mode of the waveguide. Transmitting in-phase and quadrature (I/Q) components is advantageous because of the symmetry of the I/Q signals and the less-complicated nature of the I/Q electronics. The I/Q modulation technique lends itself well to digital processes. Modulation of a carrier with a waveform changes the carrier's frequency slightly; it has both a real and an imaginary part, or an in-phase (I) and a quadrature (Q) part. A receiver at the other end of the DWG may decipher information by reading the I and Q parts of the modulated signal using well known techniques.

In another embodiment, there may be two separate transmitters. In this case, one stream of data may be launched into a DWG from one of the transmitters by exciting a first mode of the DWG and a second stream of data may be launched into the DWG from a second transmitter by exciting a second orthogonal mode of the DWG.

In any of these embodiments, additional control logic 1602 may provide control of the transmitter and link to one or more data sources that may be providing data for transmission.

Device 1600 may be fabricated on a single integrated circuit (IC) using known or later developed semiconductor processing techniques. Various processors, memory circuits, and peripheral circuits may also be fabricated on the IC to form a complex system on chip (SoC) IC, for example.

Figure 17:
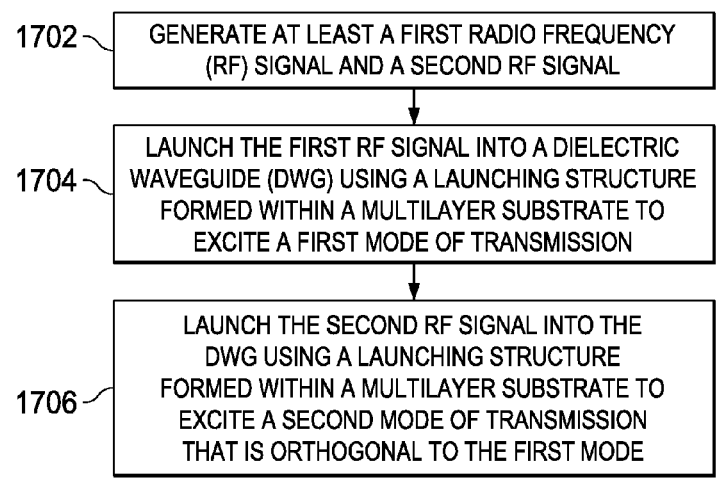
FIG. 17 is a flow chart illustrating simultaneous launching of multiple signal channels into a DWG.

FIG. 17 is a flow chart illustrating simultaneous launching of multiple signal channels into a DWG. A transmitter generates 1702 two or more radio frequency (RF) signals. As discussed above, the transmitter may be generating I/Q modulated signals. In another embodiment, the transmitter may perform FDD (frequency domain duplexing/multiplexing) where the orthogonal modes of the waveguide operate at different frequencies, and multiple launching structures feed those modes based on the frequency content. Filters may be used to separate the data streams based on frequency.

In another embodiment, the transmitter may have two or more separate units that are each generating an RF signal in response to separate streams of data, for example.

As described above in more detail, the RF signals may be in the gigahertz region, and may be in the range of 100-200 GHz, for example. In some embodiments, the RF signals may be in the terahertz or sub-terahertz range.

One of the RF signals from the transmitter is conducted to a launching structure that launches 1704 it into the DWG by exciting a first transmission mode within the DWG.

Another one of the RF signals from the transmitter is conducted to a launching structure that launches 1706 it into the DWG by exciting a second transmission mode within the DWG that is orthogonal to the first mode.

As discussed in more detail above, the launching structures may be horizontal and vertical dipoles, horizontal or vertical patches, or other known or later developed structures that are capable of launching a RF signal into a DWG.

The various dielectric core waveguide configurations described above may be fabricated using a printing process, such as an inkjet printer or other three dimensional printing mechanism. Fabrication of three dimensional structures using ink jet printers or similar printers that can "print" various polymer materials is well known and need not be described in further detail herein. Fabrication of DWGs using 3D printing is described in more detail in U.S. patent application Ser. No. 14/498,837. Printing allows for the rapid and low-cost deposition of thick dielectric and metallic layers, such as 0.1 um-1000 um thick, for example, while also allowing for fine feature sizes, such as 20 um feature sizes, for example. Standard integrated circuit (IC) fabrication processes are not able to process layers this thick. Standard macroscopic techniques, such as machining and etching, typically used to manufacture dielectric waveguides and metallic structures may only allow feature sizes down to 1 mm, for example. These thicker printed dielectric and metallic layers on the order of 100 nm-1 mm which are made possible by inkjet printing enable waveguide operation at Sub-THz and THz frequencies. Previously optical frequencies could be handled using standard semiconductor fabrication methods while lower frequencies may be handled using large metallic waveguides; however, there was a gap in technology for fabricating waveguides for THz signals. Printing the waveguides directly onto the chip/package/board mitigates alignment errors of standard waveguide assemblies and simplifies the packaging process.

Other Embodiments

While the invention has been described with reference to illustrative embodiments, this description is not intended to be construed in a limiting sense. Various other embodiments of the invention will be apparent to persons skilled in the art upon reference to this description. For example, while various embodiments of exciting mode 1 and mode 2 (referring to FIGS. 4A and 4B) other embodiments may excite different and/or additional orthogonal transmission modes in order to transmit multiple channels of information through a DWG.

While various configurations of dipole and patch antennas have been described herein, other known or later developed launching structures may be used in combinations to excite multiple orthogonal transmission modes in a DWG. For example, a DWG with N orthogonal modes may be used, not just two. In this case, N dipoles with rotational angles aligned with each orthogonal mode may be used, for example.

Another embodiment may use near field coupling structures such as: a loop, an e-field probe, etc.

While a dielectric waveguide has been described herein, another embodiment may use a metallic or non-metallic conductive material to form the top, bottom, and sidewalls of the wave guide, such as: a conductive polymer formed by ionic doping, carbon and graphite based compounds, conductive oxides, etc., for example.

While waveguides with polymer dielectric cores have been described herein, other embodiments may use other materials for the dielectric core, such as ceramics, glass, etc., for example.

The substrate on which a dielectric core waveguide is formed may be rigid or flexible, planar or non-planar, smooth or irregular, etc., for example. Regardless of the topology of the substrate, the dielectric core waveguide may be formed on the surface of the substrate and conform to the topology of the surface, for example.

While dielectric cores with a rectangular cross section are described herein, other embodiments may be easily implemented using the printing processes described herein. For example, the dielectric core may have a cross section that is rectangular, square, trapezoidal, cylindrical, oval, or many other selected geometries. Furthermore, the cross section of a dielectric core to change along the length of a waveguide in order to adjust impedance, produce transmission mode reshaping, etc., for example.

In some embodiments, the substrate may be removed after forming a waveguide using an inkjet printing or other 3D printing process by dissolving the substrate with an appropriate solvent or melting a heat sensitive substrate, for example. In this manner, a free standing waveguide that may have a complicated shape may be formed.

The dielectric core of the conductive waveguide may be selected from a range of approximately 2.4-12, for example. These values are for commonly available dielectric materials. Dielectric materials having higher or lower values may be used when they become available.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A signal transmitting device comprising:
   a multilayer substrate having a first surface and an opposite second surface, with an edge surface arranged between the first surface and the second surface;
   a first transmitter circuit having a radio frequency (RF) output port;
   a vertical antenna formed within the substrate between the first surface and the second surface and adjacent to the edge surface, in which the vertical antenna is a dipole antenna oriented perpendicular to the first surface; in which a first arm extends toward the first surface from a first middle conductive layer of the multilayer substrate and in which a second arm extends toward the second surface from a second middle conductive layer of the multilayer substrate; and
   in which the first arm and the second arm are coupled to the output port of the first transmitter.

2. The device of claim 1, in which the first arm and the second arm each extend through a plurality of conductive layers of the multilayer substrate and in which a conductive fishbone rib structure is formed in each of the plurality of conductive layers and coupled to the respective first arm and second arm.

3. The device of claim 1, further including:
   a second transmitter circuit having a radio frequency (RF) output port;
   a horizontal antenna formed on a third middle conductive layer within the substrate between the first surface and the second surface and adjacent to the edge surface, in which the horizontal antenna is a dipole antenna with a first arm and a second arm oriented parallel to the first surface; and
   in which the first arm and the second arm of the horizontal antenna are coupled to the output port of the second transmitter.

4. The device of claim 3, in which the first transmitter circuit and the second transmitter circuit are included within a single transmitter having multiple outputs.

5. The device of claim 3, in which the first transmitter is configured to form an in-phase modulated signal and the second transmitter is configured to form a quadrature phase modulated signal.

6. A signal transmitting device comprising:
   a multilayer substrate having a first dielectric surface and an opposite second surface, with an edge surface arranged between the first dielectric surface and the second surface;
   a first transmitter circuit having a radio frequency (RF) output port;
   a second transmitter having a radio frequency (RF) output port;
   a first antenna having arms parallel to the first dielectric surface and coupled to the output port of the first transmitter circuit configured to launch an electromagnetic wave into a dielectric waveguide (DWG) using a first transmission mode; and
   a second antenna having arms perpendicular to the first dielectric surface and coupled to the output port of the second transmitter circuit configured to launch an electromagnetic wave into the DWG using a second transmission mode, in which the second transmission mode is orthogonal to the first transmission mode.

7. The device of claim 6, in which the first transmitter circuit and the second transmitter circuit are included within a single transmitter.

8. The device of claim 6, in which the first transmitter circuit is configured to form an in-phase modulated signal and the second transmitter circuit is configured to form a quadrature phase modulated signal.

9. The device of claim 6, further comprising:
   a first filter circuit coupled to the first transmitter circuit with an output coupled to the first antenna; and
   a second filter circuit coupled to the second transmitter circuit with an output coupled to the second antenna.

10. The device of claim 6, in which the first antenna is a dipole antenna formed from a conductive layer of the multilayer substrate; and
    in which the second antenna is a vertical dipole antenna oriented perpendicular to the first dielectric surface; in which a first arm extends toward the first dielectric surface from a first middle conductive layer of the multilayer substrate and in which a second arm extends toward the second surface from a second middle conductive layer of the multilayer substrate.

11. The device of claim 10, in which the first arm and the second arm each extend through a plurality of conductive layers of the multilayer substrate and in which a conductive fishbone rib structure is formed in each of the plurality of conductive layers and coupled to the respective first arm and second arm.

12. The device of claim 6, in which the first antenna and the second antenna form a combined patch antenna having a grid of conductive rows and columns.

13. The device of claim 12, in which the patch antenna is oriented perpendicular to the first dielectric surface and parallel to the edge surface.

14. The device of claim 6, in which the first antenna is a log periodic antenna formed on one or more conductive layers of the multilayer substrate and oriented parallel to the first dielectric surface.

15. The device of claim 6, in which the second antenna includes a plurality of vertical dipoles to form a log periodic antenna oriented perpendicular to the first dielectric surface.

16. The device of claim 15, in which each of the vertical dipoles extends through a plurality of conductive layers of the multilayer substrate and in which a plurality of conductive fishbone rib structures is formed in each of the plurality of conductive layers and coupled to respective ones of the plurality of vertical dipoles.

17. The device of claim 6, further including a dielectric waveguide coupled to simultaneously receive a signal launched by the first antenna and by the second antenna.

18. A method for transmitting multiple channels of information through a dielectric waveguide, the method comprising:
    generating a first radio frequency signal (RF) and a second RF signal;
    launching the first RF signal into a dielectric waveguide (DWG) using a first antenna having arms formed parallel to a dielectric layer of a multilayer substrate to excite a first transmission mode of the DWG; and launching the second RF signal into the DWG using a second antenna having arms formed perpendicular to the dielectric layer of the multilayer substrate to excite a second transmission mode of the DWG, in which the second transmission mode is orthogonal to the first transmission mode.

19. The method of claim 18, in which the first antenna is a dipole antenna formed from a conductive layer of the multilayer substrate; and in which the second antenna is a vertical dipole antenna in which a first arm extends above the dielectric layer of the multilayer substrate and in which a second arm extends below the dielectric layer of the multilayer substrate.

20. The method of claim 18, in which the first antenna and the second antenna form a combined patch antenna having a grid of conductive rows and columns formed within the multilayer substrate.

\* \* \* \* \*